(12) United States Patent
Thomas

(10) Patent No.: US 10,607,310 B1
(45) Date of Patent: Mar. 31, 2020

(54) DETERMINING RANGES BY IMAGING DEVICES WITH DYNAMIC BASELINE RECONFIGURATION

(71) Applicant: Amazon Technologies, Inc., Seattle, WA (US)

(72) Inventor: Conner Riley Thomas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 135 days.

(21) Appl. No.: 15/786,375

(22) Filed: Oct. 17, 2017

(51) Int. Cl.
*G06T 1/00* (2006.01)
*G06K 9/78* (2006.01)
*G06T 7/55* (2017.01)

(52) U.S. Cl.
CPC .............. *G06T 1/0007* (2013.01); *G06K 9/78* (2013.01); *G06T 7/55* (2017.01); *G06T 2207/10021* (2013.01)

(58) Field of Classification Search
CPC ...................... G06T 1/0007; G06T 7/55; G06T 2207/10021; G06K 9/78
USPC .......................................................... 382/106
See application file for complete search history.

(56) References Cited

U.S. PATENT DOCUMENTS

| | | | |
|---|---|---|---|
| 5,769,359 A | 6/1998 | Rutan et al. | |
| 6,056,237 A | 5/2000 | Woodland | |
| 7,463,305 B2 | 12/2008 | Wada | |
| 9,030,149 B1 | 5/2015 | Chen et al. | |
| 9,692,953 B2 | 6/2017 | Xiong et al. | |
| 9,840,339 B1 | 12/2017 | O'Brien et al. | |
| 2003/0230671 A1 | 12/2003 | Dunn | |
| 2009/0310824 A1* | 12/2009 | Kenner | G07D 7/128 382/106 |
| 2012/0145834 A1 | 6/2012 | Morgan et al. | |
| 2013/0194816 A1 | 8/2013 | Hager et al. | |
| 2014/0098990 A1 | 4/2014 | Vian et al. | |
| 2014/0158816 A1 | 6/2014 | DeLorean | |

(Continued)

FOREIGN PATENT DOCUMENTS

| | | | |
|---|---|---|---|
| WO | 2004056090 A1 | 7/2004 | |
| WO | WO-2017032335 A1 * | 3/2017 | ............. G01B 11/02 |

OTHER PUBLICATIONS

Stasicki Boleslaw et al., "In-flight measurements of aircraft propeller deformation by means of an autarkic fast rotating imaging system", Mar. 4, 2015, Optomechatronic Micro/Nano Devices and Components III : Oct. 8-10, 2007, Lausanne, Switzerland; Proceedings of the SPIE, SPIE, Bellingham, WA, pp. 93022S-93022S, XP060045890, ISBN: 978-1-62841-730-2 section 2.2; figures 4,5.

*Primary Examiner* — Amandeep Saini
(74) *Attorney, Agent, or Firm* — Athorus, PLLC

(57) ABSTRACT

An aerial vehicle may be outfitted with two or more digital cameras that are mounted to a track, a rail or another system for accommodating relative motion between the cameras. A baseline distance between the cameras may be established by repositioning one or more of the cameras. Images captured by the cameras may be processed to recognize one or more objects therein, and to determine ranges to such objects by stereo triangulation techniques. The baseline distances may be varied by moving one or more of the cameras, and ranges to objects may be determined using images captured by the cameras at each of the baseline distances.

20 Claims, 22 Drawing Sheets

(56) References Cited

U.S. PATENT DOCUMENTS

| | | | |
|---|---|---|---|
| 2014/0267633 A1* | 9/2014 | Venkataraman | G01P 3/38 |
| | | | 348/48 |
| 2014/0334668 A1* | 11/2014 | Saund | G06T 7/20 |
| | | | 382/103 |
| 2014/0368637 A1 | 12/2014 | Yeeles | |
| 2015/0161798 A1 | 6/2015 | Venkataraman et al. | |
| 2015/0252789 A1 | 9/2015 | Bunge | |
| 2015/0331426 A1 | 11/2015 | Shi et al. | |
| 2015/0367957 A1 | 12/2015 | Uskert et al. | |
| 2016/0070260 A1 | 3/2016 | Levien et al. | |
| 2016/0159473 A1 | 6/2016 | Wang et al. | |
| 2016/0163206 A1 | 6/2016 | Fisher et al. | |
| 2016/0214713 A1 | 7/2016 | Cragg | |
| 2016/0272317 A1 | 9/2016 | Cho et al. | |
| 2017/0240281 A1 | 8/2017 | Veto | |
| 2018/0054604 A1 | 2/2018 | Boyd et al. | |
| 2018/0241923 A1* | 8/2018 | Lu | G01B 11/02 |

\* cited by examiner

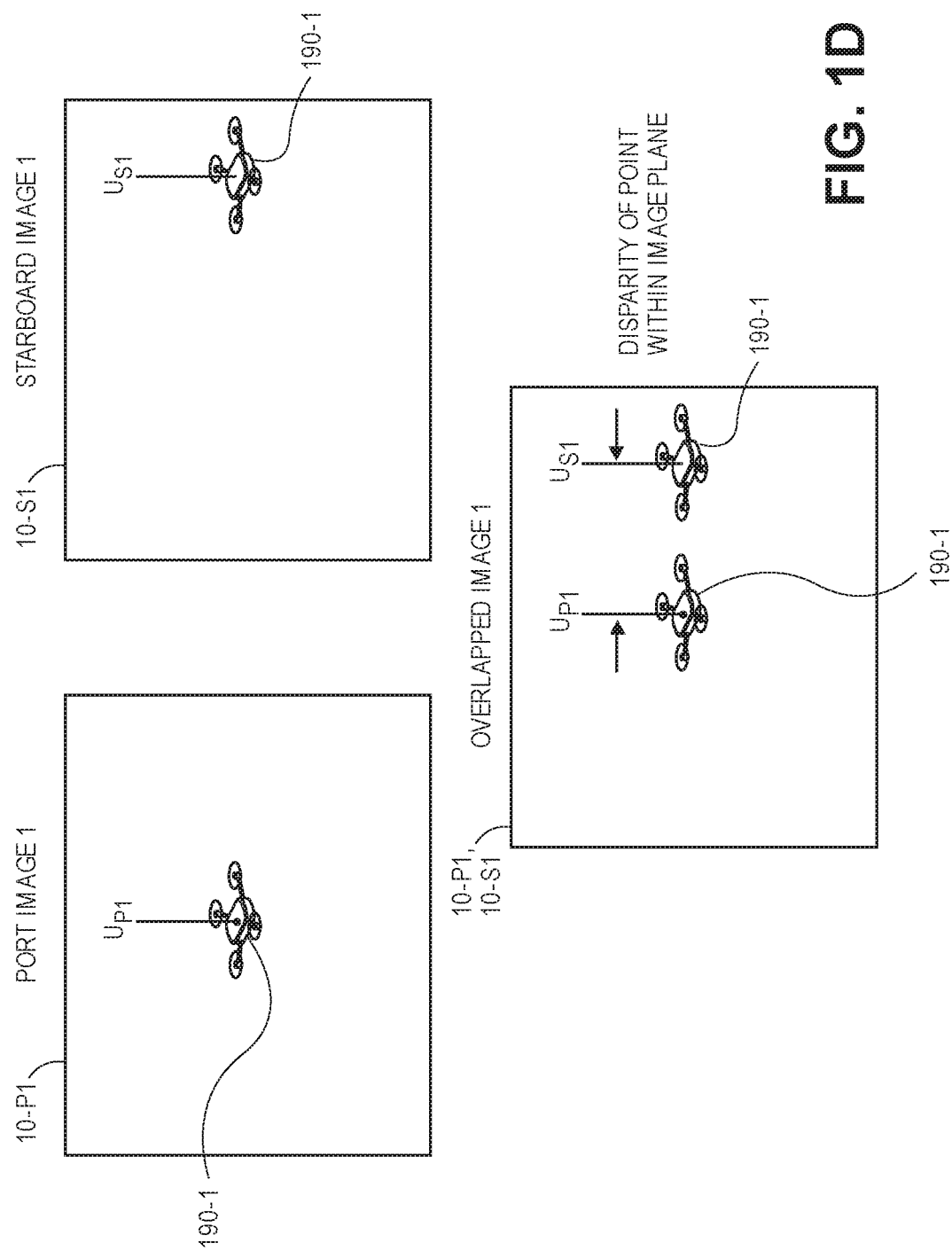

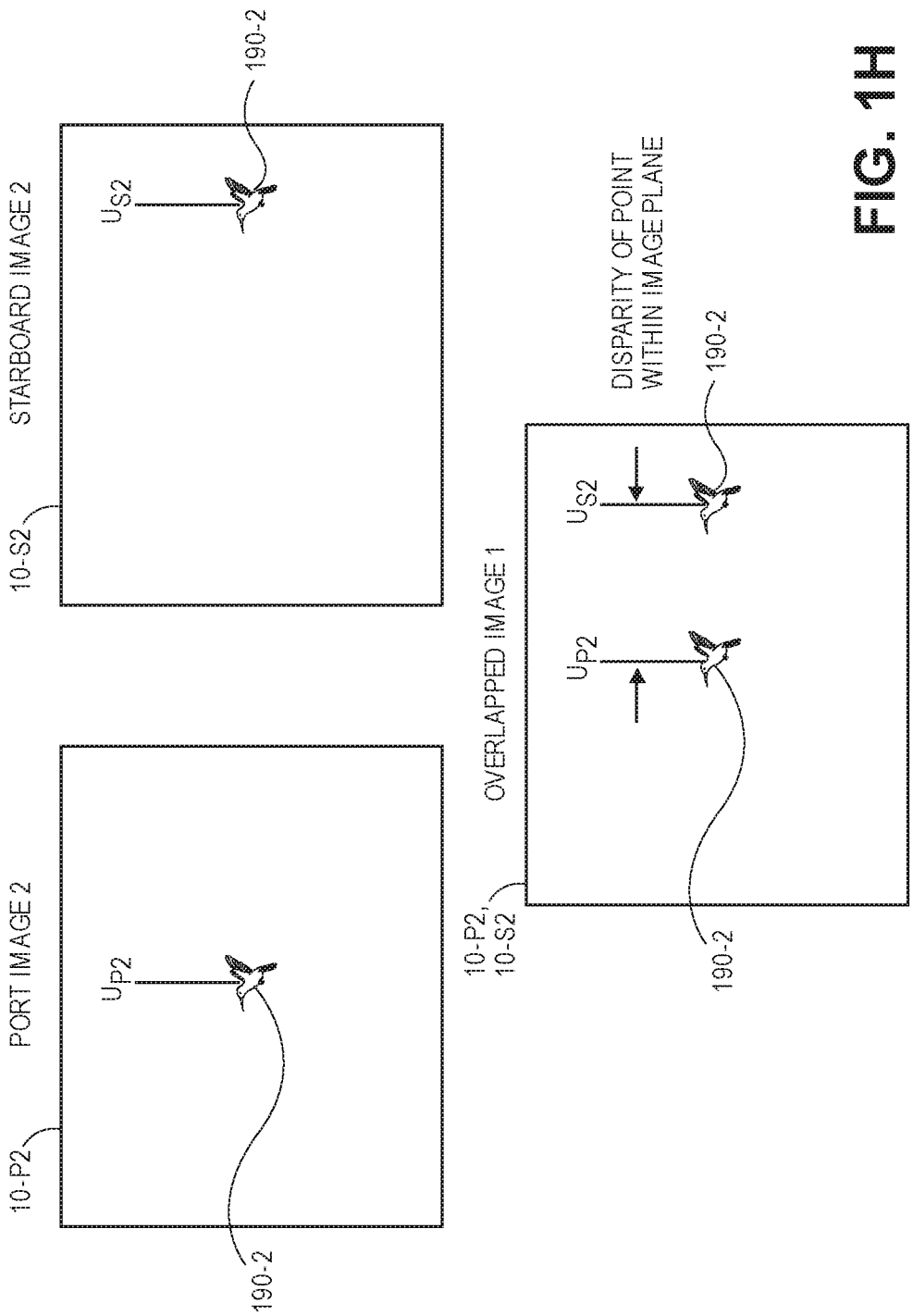

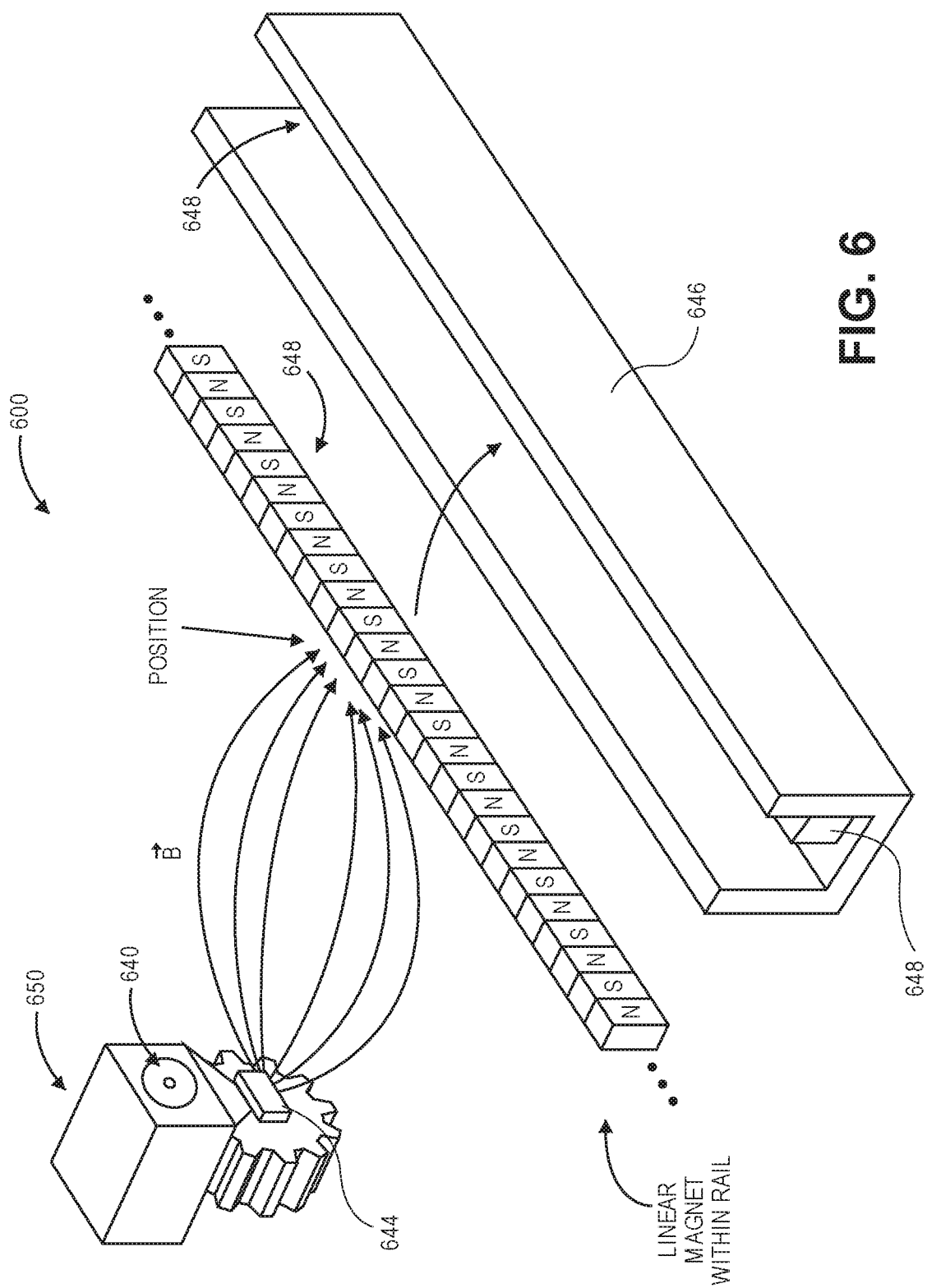

DETERMINING RANGES BY IMAGING DEVICES WITH DYNAMIC BASELINE RECONFIGURATION

BACKGROUND

Many aerial vehicles such as airplanes, helicopters or other airships are configured to operate in two or more flight modes, including a forward flight mode (or a substantially horizontal flight mode) in which the aerial vehicle travels from one point in space (e.g., a land-based point or, alternatively, a sea-based or air-based point) to another point by traveling over at least a portion of the Earth. An aerial vehicle may also be configured to engage in a vertical flight mode in which the aerial vehicle travels in a vertical or substantially vertical direction from one altitude to another altitude (e.g., upward or downward, from a first point on land, on sea or in the air to a second point in the air, or vice versa) substantially normal to the surface of the Earth, or hovers (e.g., maintains a substantially constant altitude), with an insubstantial change in horizontal or lateral position. An aerial vehicle may be further configured to engage in both forward and vertical flight modes, e.g., in a hybrid mode in which a position of the aerial vehicle changes in both horizontal and vertical directions. Forces of lift and thrust are commonly applied to aerial vehicles using one or more propellers, or devices having blades that are mounted about a hub and joined to a shaft or other component of a prime mover, which may rotate at angular velocities of thousands of revolutions per minute during flight operations.

During flight operations, aerial vehicles (including, specifically, unmanned aerial vehicles, or UAVs) frequently must remain aware of distances between such vehicles and one or more structures, features, objects, humans (or other animals). For example, when an aerial vehicle is in transit between an origin and a destination, by way of any number of waypoints, the aerial vehicle should remain aware of ranges between the aerial vehicle and any number of airborne or ground-based objects, including but not limited to buildings or other structures, utility poles or other facilities, trees or other plant life, or other aerial vehicles, as well as altitudes above ground surfaces, in order to ensure that the aerial vehicle reaches the destination safely and in accordance with applicable laws and regulations. Additionally, when an aerial vehicle intends to hover, the aerial vehicle should accurately determine its altitude with respect to ground surfaces. Likewise, when an aerial vehicle intends to take off or land, the aerial vehicle should remain aware of ranges between the aerial vehicle and ground surfaces during an ascent or descent, and also ranges between the aerial vehicle and any surrounding objects within a vicinity of a take-off area or landing area.

Aerial vehicles are frequently equipped with one or more imaging devices such as digital cameras which may be used to aid in the guided or autonomous operation of an aerial vehicle, to determine when the aerial vehicle has arrived at or passed over a given location, or is within range of one or more structures, features, objects or humans (or other animals), to conduct surveillance or monitoring operations, or for any other purpose. Aerial vehicles may be outfitted with imaging devices in any manner, e.g., by embedding or mounting imaging devices to one or more external surfaces of frames, motors, propellers, control surfaces, appurtenances or extensions, or other features.

Stereo ranging (or stereo triangulation) is a process by which distances or ranges to objects may be determined from digital images depicting such objects that are captured using imaging devices, such as digital cameras, that are separated by a fixed distance. For example, by processing pairs of images of an environment that are captured by imaging devices, ranges to points expressed in both of the images (including but not limited to points associated with specific objects) may be determined by finding a virtual intersection of pairs of lines extending from the respective lenses or sensors of the imaging devices through representations of such points within each of the images. If each of the images of the environment is captured substantially simultaneously, or if conditions of the environment are substantially unchanged when each of the images is captured, a range to a single point within the environment at a given time may be determined based on a baseline distance between the lenses or sensors of the imaging devices that captured such images and a disparity, or a distance between corresponding representations of a single point in space expressed within both of the images when the images are superimposed upon one another. Such processes may be completed for any number of points in three-dimensional space that are expressed in both of the images, and a model of such points, e.g., a point cloud, a depth map or a depth model, may be defined accordingly. The model of such points may be updated as pairs of images are subsequently captured and processed to determine ranges to such points.

BRIEF DESCRIPTION OF THE DRAWINGS

FIGS. 1A through 1I are views of aspects of one system for determining ranges by imaging devices with dynamic baseline reconfiguration in accordance with embodiments of the present disclosure.

FIG. 6 is a view of aspects of one system for determining ranges by imaging devices with dynamic baseline reconfiguration in accordance with embodiments of the present disclosure.

DETAILED DESCRIPTION

As is set forth in greater detail below, the present disclosure is directed to determining ranges using imaging devices that are configured for dynamic baseline reconfiguration. More specifically, the systems and methods disclosed herein are directed to determining stereo distance information using imaging devices (e.g., digital cameras) having variable relative distances (e.g., baseline distances) between them that may be mounted to objects that are either stationary or in motion, such as an aerial vehicle, or one or more ground-based structures. The imaging devices may be digital cameras (e.g., black-and-white, grayscale or color cameras) or any other devices for capturing and interpreting light that is reflected from one or more objects. In some embodiments, one or more imaging devices may include or be joined to a mount or other structure that is configured to move in one or more directions or along one or more axes with respect to other imaging devices, in order to establish a desired baseline distance between the imaging devices. When a first imaging device and a second imaging device are provided at a desired baseline distance, a first image may be captured using the first imaging device, and a second image may be captured using the second imaging device. The first image and the second image may be aligned with respect to one another, and ranges to objects expressed in each of the images may be determined according to one or more stereo ranging algorithms or techniques, based on the baseline distance and any disparities identified within the respective images. In accordance with some embodiments of the present disclosure, the ability to establish a desired, relative baseline distance between imaging devices enables the imaging devices to determine ranges to one or more airborne or ground-based objects with accuracy and precision using stereo triangulation, e.g., one or more computer-based stereo ranging algorithms or techniques, regardless of how near or how far such objects are located from the imaging devices.

Figure 1A:
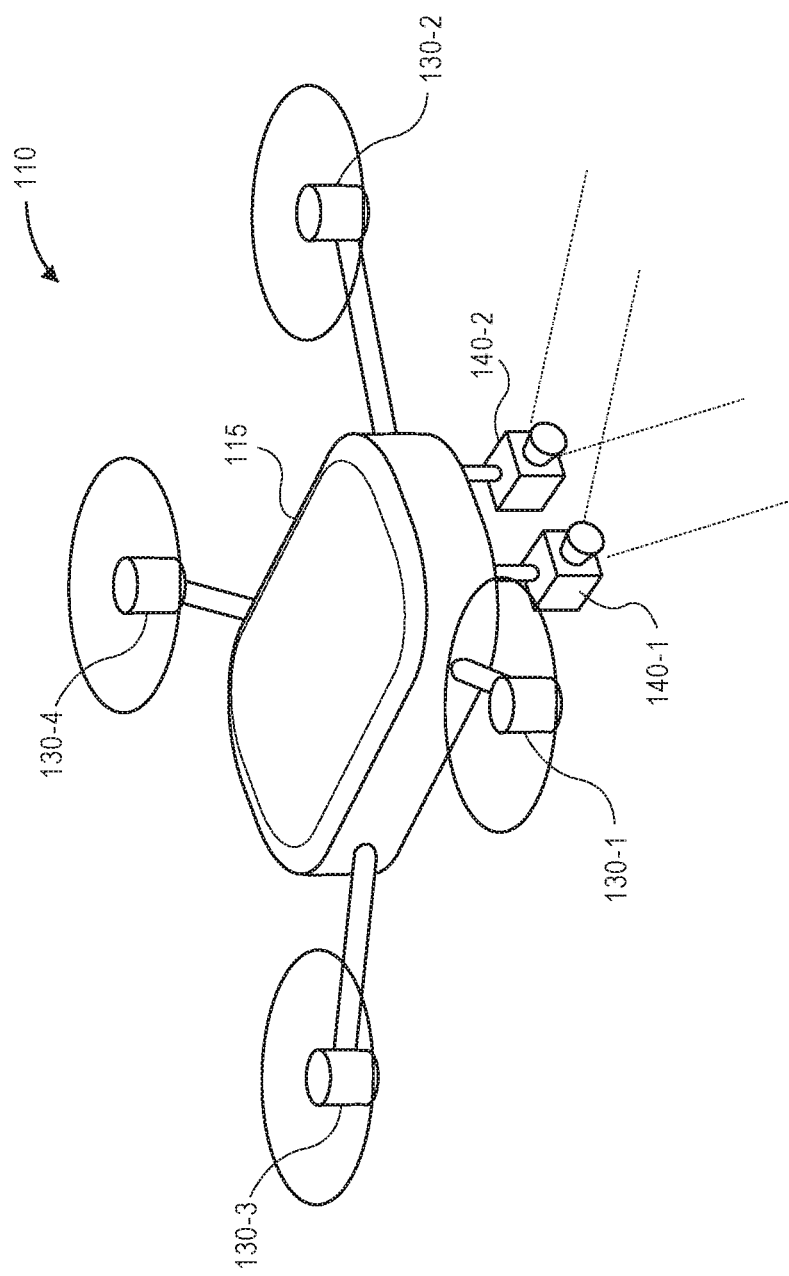

Referring to FIGS. 1A through 1I, a system for determining ranges by imaging devices with dynamic baseline reconfiguration in accordance with embodiments of the present disclosure is shown. As is shown in FIG. 1A, an aerial vehicle 110 includes a frame 115, a plurality of propulsion motors 130-1, 130-2, 130-3, 130-4 and a plurality of imaging devices 140-1, 140-2. Each of the propulsion motors 130-1, 130-2, 130-3, 130-4 is mounted to the frame and rotatably coupled with a propeller by way of a mast or a shaft of a transmission. Each of the propulsion motors 130-1, 130-2, 130-3, 130-4 is configured to rotate the propellers about the mast or shaft, at a desired angular velocity, to provide forces of lift or thrust to the aerial vehicle 110. Each of the imaging devices 140-1, 140-2 is mounted to an underside of the frame 115, with the imaging device 140-1 provided on a starboard side of the aerial vehicle 110, and the imaging device 140-2 provided on a port side of the aerial vehicle 110. As is shown in FIG. 1A, each of the imaging devices 140-1, 140-2 is aligned with fields of view that are oriented in a substantially forward direction with respect to the frame 115, and overlap at least in part forward of the aerial vehicle 110. Alternatively, in some embodiments, the imaging devices 140-1, 140-2 may be aligned with fields of view that are oriented in a substantially downward direction with respect to the frame 115, or in any other direction with respect to the frame 115.

Figure 1B:
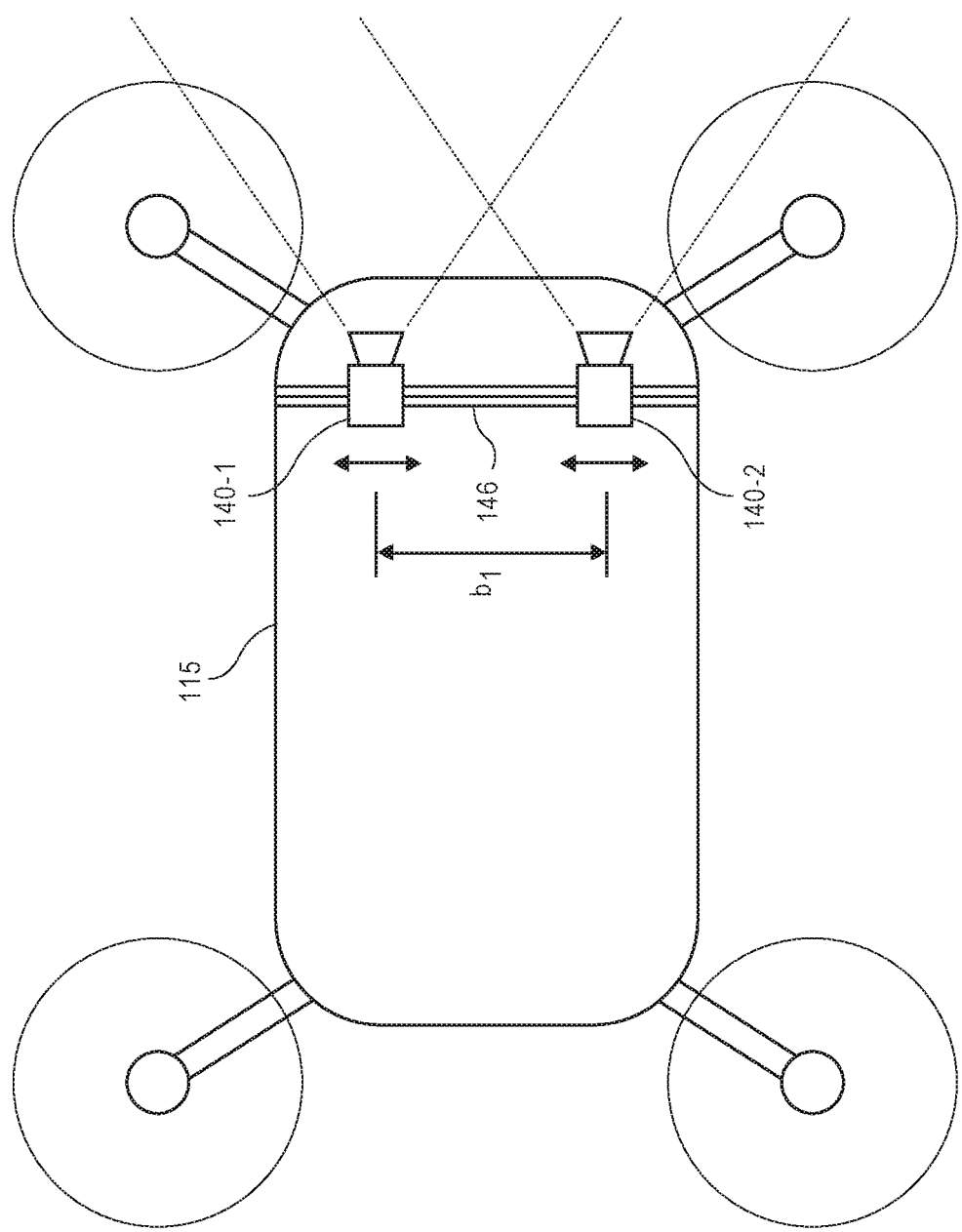

As is shown in FIG. 1B, the imaging devices 140-1, 140-2 are each mounted to the underside of the frame 115 of the aerial vehicle 110 by way of a track 146, or a rail, or another system that enables each of the imaging devices 140-1, 140-2 to move independently with respect to one another along an axis or in directions defined by the track 146, and to establish a desired baseline distance b between them. For example, as is shown in FIG. 1B, each of the imaging devices 140-1, 140-2 may be equipped with one or more motors, belts, wheels, gears, drive shafts or other components that permit the respective imaging devices 140-1, 140-2 to translate, slide, or otherwise reposition themselves along the track 146, as desired, in order to establish a baseline distance between the respective imaging devices. The track 146 may further include one or more encoders or other systems for confirming positions of the respective imaging devices 140-1, 140-2. Alternatively, one or both of the imaging devices 140-1, 140-2 may be configured to further rotate about any axis with respect to their respective mountings, e.g., to yaw, pitch or roll.

Figure 1C:
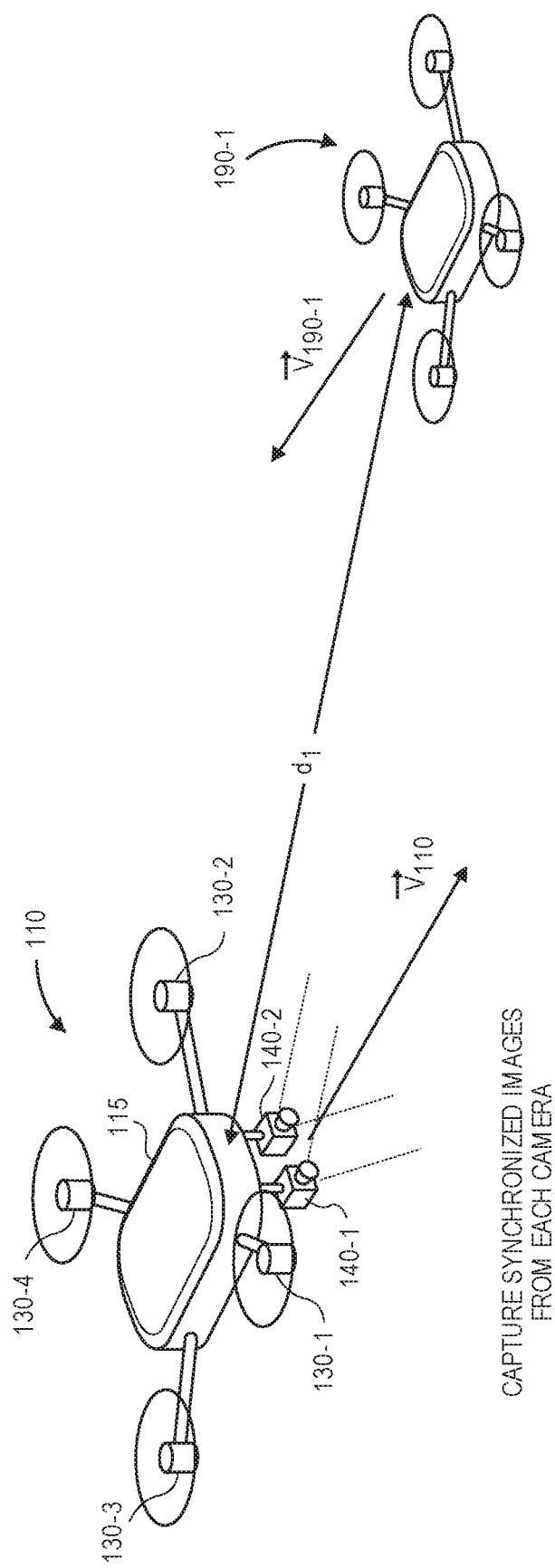

As is discussed above, in accordance with the present disclosure, the aerial vehicle 110 may be configured to determine distances or ranges to one or more airborne or ground-based objects based on images captured by the imaging devices 140-1, 140-2. For example, the imaging device 140-1, 140-2 may be configured to capture color or grayscale images of ground-based features in the area in which the aerial vehicle 110 operates (e.g., structures, vehicles or other machines, plant or animal life), or airborne elements that may approach or be located near the aerial vehicle 110 (e.g., birds, other aerial vehicles, or any other airborne objects). As is shown in FIG. 1C, the aerial vehicle 110 may capture pairs of images simultaneously, or nearly simultaneously, using each of the imaging devices 140-1, 140-2, while traveling at a velocity $V_{110}$. The aerial vehicle 110 may process such images to determine a distance or range $d_1$ to an airborne object 190-1 (e.g., another aerial vehicle) that appears within the images, according to one or more stereo ranging algorithms or techniques. The airborne object 190-1 may be traveling at a velocity $V_{190-1}$.

The pairs of images that are captured by the imaging devices 140-1, 140-2 may be co-aligned and subjected to one or more stereo ranging analyses, in order to determine ranges to any number of points that are expressed in both of the images. As is shown in FIG. 1D, the imaging device 140-2 may capture a port image 10-P1, and the imaging device 140-1 may capture a starboard image 10-S1. The port image 10-P1 and the starboard image 10-S1 may be provided to a computer device residing aboard the aerial vehicle 110 for processing. Such a computer device may reside on the aerial vehicle 110 (e.g., within the frame 115) or in one or more external locations, including but not limited to a ground-based or a "cloud"-based facility having one or more servers or other computer devices, a facility residing aboard one or more other aerial vehicles (not shown), or a facility provided in any other location. The features of the images 10-P1, 10-S-1 captured by the imaging devices 140-1, 140-2 may be fused (e.g., overlapped) together, in order to determine which points expressed in the port image 10-P1 correspond to points expressed in the starboard image 10-S1. Distances to points corresponding to such features may be determined according to stereo ranging algorithms or techniques and stored in one or more data stores or used for any purpose, including but not limited to navigation, guidance, surveillance or collision avoidance.

For example, as is shown in FIG. 1D, the airborne object 190-1 appears within the overlapping fields of view of the imaging devices 140-1, 140-2. The port image 10-P1 includes a projection $U_{P1}$ of one or more points corresponding to the airborne object 190-1, and the starboard image 10-S1 includes a projection $U_{S1}$ of the one or more points corresponding to the airborne object 190-1. A disparity of the one or more points of the projections $U_{P1}$, $U_{S1}$, or $(U_{P1}-U_{S1})$, may be determined by virtually overlapping the port image 10-P1 and the starboard image 10-S1.

Figure 1E:
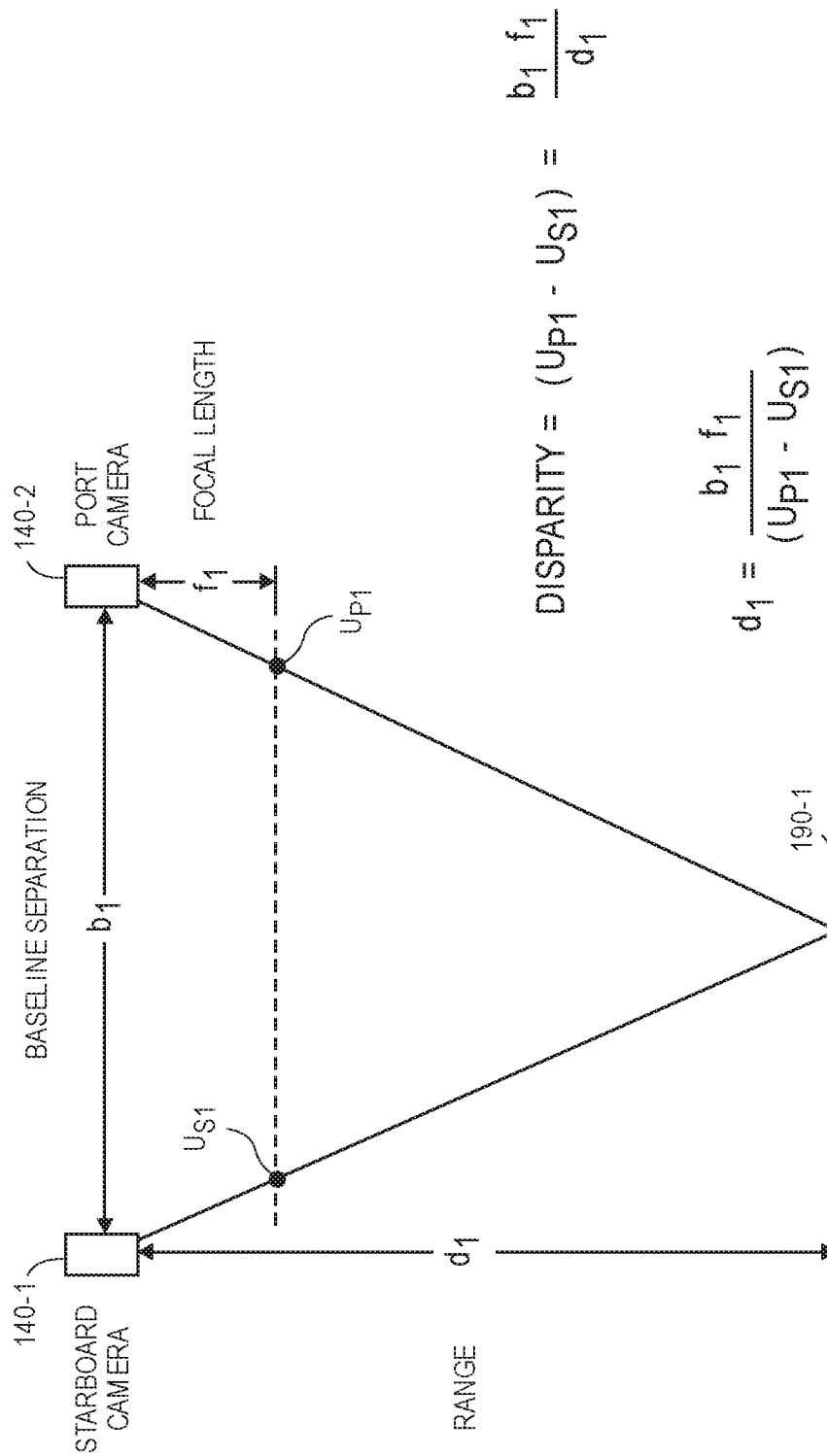

As is shown in FIG. 1E, the range or distance $d_1$ to the one or more points corresponding to the airborne object 190-1 may be determined based on the disparity $(U_{P1}-U_{S1})$, as well as the baseline distance $b_1$ between the lenses and/or sensors of the imaging devices 140-1, 140-2 at a time when the images 10-P1, 10-S1 were captured, and a focal length $f_1$ of the respective imaging devices 140-1, 140-2 at the time when the images 10-P1, 10-S1 were captured. Ranges or distances to each surface point of the airborne object 190-1 that is visible within the port image 10-P1 may be calculated in a similar manner, e.g., by identifying each of such surface points in the starboard image 10-S1, and determining a disparity between representations of each of such surface points within the images 10-P1, 10-S1. Accordingly, a range or distance to the airborne object may be determined as an average of such ranges or distances, based on a minimum value of such ranges or distances, or in any other manner. In some embodiments, the imaging devices 140-1, 140-2 may have the same focal length, viz., $f_1$, when the images 10-P1, 10-S1 are captured. In other embodiments, the imaging devices 140-1, 140-2 may have different focal lengths when the images 10-P1, 10-S1 are captured.

Figure 1F:
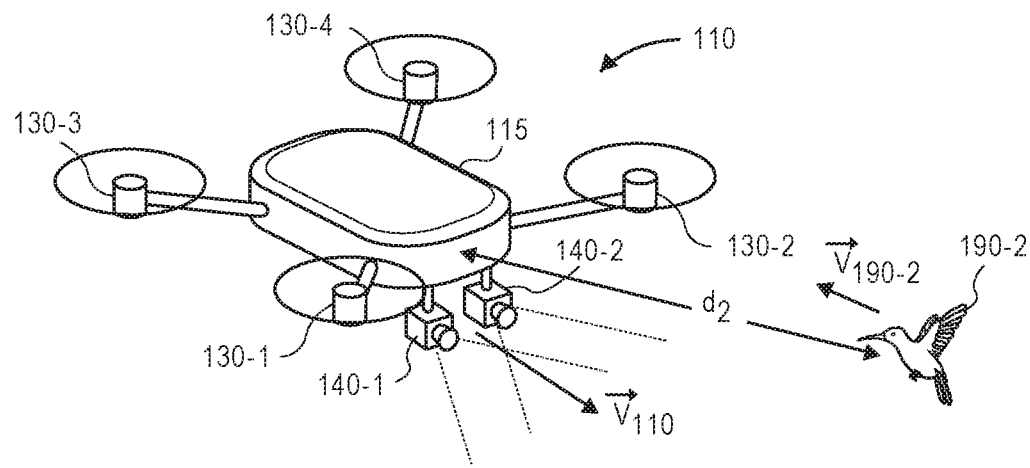
Figure 1G:
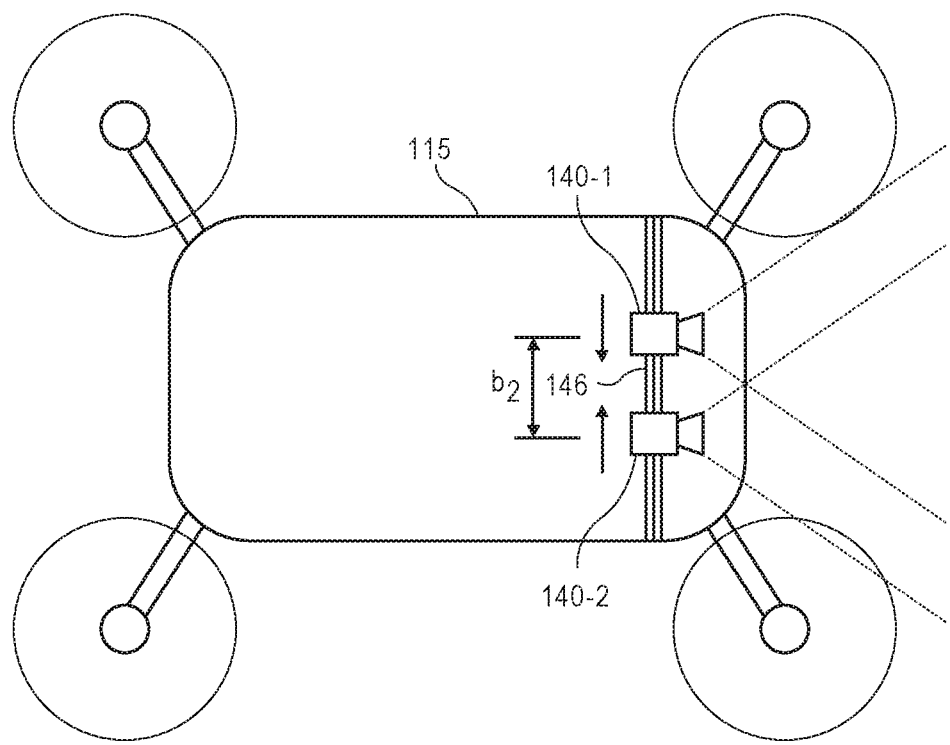

In accordance with the present disclosure, ranges to other objects may be determined by repositioning one or both of the imaging devices 140-1, 140-2 with respect to one another, e.g., within the track 146, and capturing images simultaneously or nearly simultaneously by each of the imaging devices 140-1, 140-2. As is shown in FIG. 1F, the aerial vehicle 110 may capture pairs of images simultaneously, or nearly simultaneously, using each of the imaging devices 140-1, 140-2, and may process such images to determine a distance or range $d_2$ to an airborne object 190-2 (e.g., an airborne animal such as a bird), according to one or more stereo ranging algorithms or techniques. The airborne object 190-2 may be traveling at a velocity $V_{190-2}$. For example, as is shown in FIG. 1G, one or both of the imaging devices 140-1, 140-2 may be translated until the imaging devices 140-1, 140-2 are located at a baseline distance $b_2$ with respect to one another. The baseline distance $b_2$ shown in FIG. 1G is smaller than the baseline distance $b_1$ shown in FIG. 1B.

As is shown in FIG. 1H, the imaging device 140-2 may capture a port image 10-P2 and the imaging device 140-1 may capture a starboard image 10-S2. The features of the port image 10-P2 and the starboard image 10-S2 may be fused (e.g., overlapped) together, in order to determine which points expressed in the port image 10-P2 correspond to points expressed in the starboard image 10-S2. The port image 10-P2 includes a projection $U_{P2}$ of one or more points corresponding to the airborne object 190-2, and the starboard image 10-S2 includes a projection Use of the one or more points corresponding to the airborne object 190-2. A disparity of the one or more points of the projections $U_{P2}$, $U_{S2}$, or $(U_{P2}-U_{S2})$, may be determined by virtually overlapping the port image 10-P2 and the starboard image 10-S2.

Figure 1I:
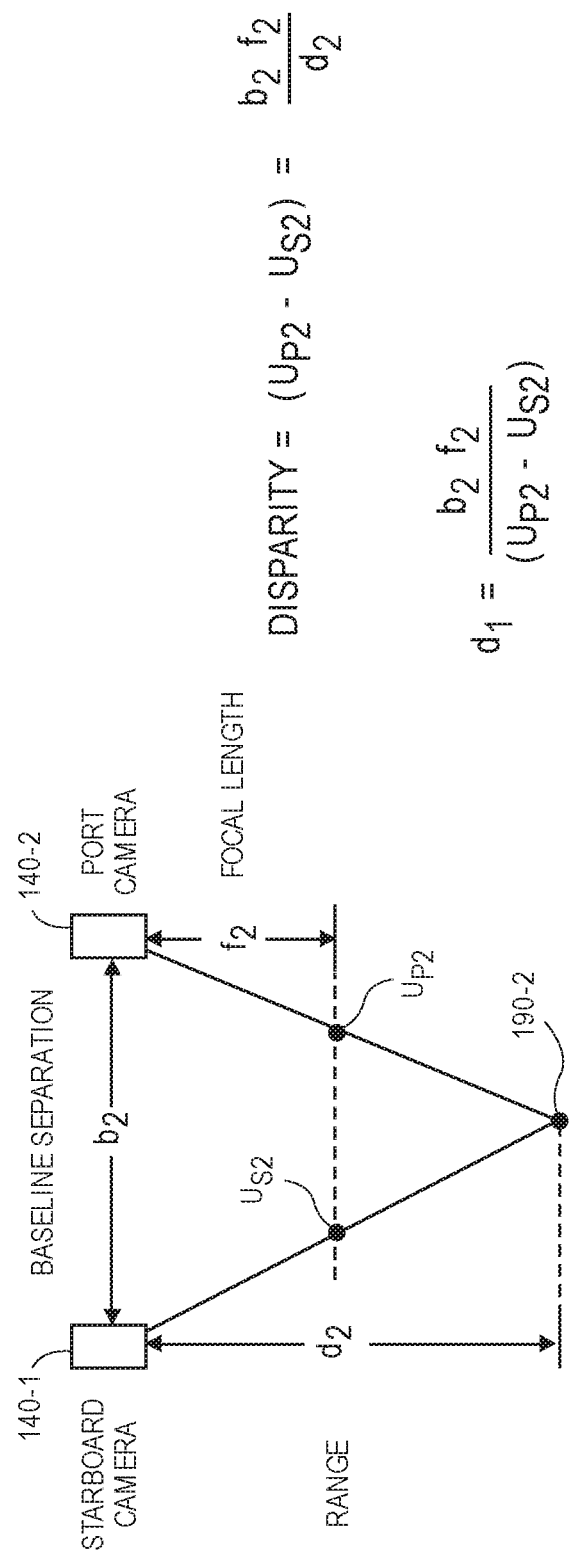

As is shown in FIG. 1I, the range or distance $d_2$ to the one or more points corresponding to the airborne object 190-2 may be determined based on the disparity $(U_{P2}-U_{S2})$, as well as the baseline distance $b_2$ between the lenses and/or sensors of the imaging devices 140-1, 140-2 at a time when the images 10-P2, 10-S2 were captured, and a focal length $f_1$ of the respective imaging devices 140-1, 140-2 at the time when the images 10-P2, 10-S2 were captured. Ranges or distances to each surface point of the airborne object 190-2 that is visible within the port image 10-P2 may be calculated in a similar manner, e.g., by identifying each of such surface points in the starboard image 10-S2, and determining a disparity between representations of each of such surface points within the images 10-P2, 10-S2. In some embodiments, the imaging devices 140-1, 140-2 may have the same focal length, viz., $f_1$, when the images 10-P2, 10-S2 are captured. In other embodiments, the imaging devices 140-1, 140-2 may have different focal lengths when the images 10-P2, 10-S2 are captured.

Accordingly, the systems and methods of the present disclosure may be used to determine ranges or distances to objects using images captured by a pair of imaging devices and processed according to one or more stereo ranging algorithms or techniques. The imaging devices may be configured to translate in a relative manner with respect to one another, and to vary a baseline distance between their respective lenses and/or sensors. When each of the imaging devices captures an image simultaneously or nearly simultaneously, distances to points appearing within each of the images may be determined based on the baseline distance, the focal lengths of the imaging devices, and disparities between such points.

In some embodiments, the imaging devices of the present disclosure may be mounted to one or more motorized and/or movable units that may translate, slide or otherwise move in one or more directions or along one or more axes. The imaging devices may be disposed within housings or other structures that are configured to travel along or within one or more tracks, rails or other systems, and may include one or more motors, belts, wheels, gears, drive shafts or other components. The imaging devices and/or housings may further include one or more encoders for determining their respective positions with respect to the tracks, rails or other systems. In some embodiments, the encoders may be magnetic encoders (e.g., linear magnetic encoders or rotary magnetic encoders), optical encoders, sonic encoders, laser encoders, or any other type of systems or components for determining positions of the imaging devices.

The various components disclosed herein, including but not limited to the imaging devices and/or their respective housings, as well as the tracks, rails or other systems for accommodating movement of one or more of the imaging devices, may be formed from any suitable materials in accordance with the present disclosure. In some embodiments, the tracks, rails or other systems may be formed from plastics (e.g., thermosetting plastics such as epoxy or phenolic resins, polyurethanes or polyesters, as well as polyethylenes, polypropylenes or polyvinyl chlorides), metals (e.g., lightweight metals such as aluminum, or metals of heavier weights including alloys of steel), composites or any other combinations of materials. In some embodiments, the tracks, rails or other systems may be formed from materials such as aluminum, titanium or other metals having sufficiently high strength-to-weight ratios, as well as any composites or other non-metallic components.

The tracks, rails or other systems may include any number of features for accommodating the movement of one or more housings or imaging devices. For example, the tracks, rails or other systems may include one or more recesses, cavities, guides, grooves, slots, or members thereon or therein. A housing or an imaging device may be configured to travel on, within, alongside, above or in any other alignment or orientation with respect to a track, a rail or other system. Additionally, the imaging devices or housings and the tracks, rails or other systems may include any number of bearings or other components or substances for reducing or managing any friction that may be encountered during motion. Moreover, the tracks, rails or other systems may comprise two or more discrete tracks, or segments of tracks, for accommodating the independent motion of two or more housings or imaging devices. For example, a first movable imaging device may be provided on a first track, and a second movable imaging device may be provided on a second track. Each of the imaging devices may be dynamically repositionable on their respective tracks, and baseline distances between the imaging devices may be calculated based on their respective positions on such tracks.

For example, in some embodiments, a track or rail system configured for accommodating a movable imaging device may include one or more magnets aligned linearly in zones with alternating magnetic polarities. The movable imaging device may include an encoder magnet having one or more magnetoresistive pickup elements disposed thereon. As the movable imaging device is repositioned with respect to the track or rail system, and the encoder magnet moves into and out of alignment with the magnet zones of the alternating magnetic polarities, one or more sensors provided in association with the magnetoresistive pickup elements or the track or rail system may detect variations in magnetic fields, and determine a position of the encoder magnet and/or the movable imaging device based on such variations. A baseline distance between the movable imaging device and another imaging device, which may be fixed or movable, may be determined based on the position of the encoder magnet and/or the movable imaging device accordingly. Any type or form of magnetic encoder may be utilized in accordance with the present disclosure.

In some other embodiments, a pair of imaging devices may each be respectively disposed in housings, and one or more of the housings may be configured to translate, slide or otherwise move in one or more directions or along one or more axes. One of the housings may include a fiducial marking having known dimensions disposed thereon, and another of the housings may include an auxiliary imaging device aligned to include the fiducial marking within a field of view. In such embodiments, a baseline distance between the imaging devices may be calculated based on one or more dimensions of the fiducial marking, as determined based on images captured by the auxiliary imaging device.

In some other embodiments, a pair of imaging devices may each be respectively disposed in housings, and one or more of the housings may be configured to translate, slide or otherwise move in one or more directions or along one or more axes. A first one of the housings may be configured with an optical light source that is aligned to transmit one or more optical beams (e.g., laser beams) toward a second one of the housings. In such embodiments, a baseline distance between the imaging devices may be calculated based on a time of flight of the optical beams. The optical beams may be received by one or more sensors provided on either of the imaging devices, e.g., as transmitted, or as reflected. Any type or form of optical encoder may be utilized in accordance with the present disclosure.

The imaging devices may be provided in any alignment or configuration with respect to one another in accordance with the present disclosure. For example, where a pair of imaging devices is provided in association with a track, a rail or another like system, one of the imaging devices may be fixed, and another of the imaging devices may be configured to translate, slide or otherwise move in a direction or along an axis defined by the track, the rail or the other like system. Alternatively, each of the imaging devices of the pair may be configured to translate, slide or otherwise move in the direction or along the axis defined by the track, the rail or the other like system. Moreover, a track, a rail or another like system for accommodating movement of one or more imaging devices may be straight or curvilinear.

The tracks, rails or other systems for accommodating motion of one or more imaging devices may be mounted, fixed, embedded or otherwise joined to one or more external surfaces of an aerial vehicle in any manner and in any orientation or alignment. For example, imaging devices may be joined to an underside of an aerial vehicle, such as is shown in FIGS. 1A and 1B. Alternatively, imaging devices and/or tracks, rails or other systems may be mounted to any other external surfaces of frames, motors, propellers, control surfaces, appurtenances or extensions, or other features of aerial vehicles. Additionally, the imaging devices may be aligned to capture still or moving images from fields of view that extend forward of the aerial vehicle, such as is shown in FIGS. 1A and 1B. Alternatively, in some embodiments, the imaging devices may be aligned to capture still or moving images from fields of view that extend in any other direction, such as from fields of view that extend in lateral (e.g., port or starboard) directions, fields of view that extend aft of the aerial vehicle, or fields of view that extend above or below the aerial vehicle. The imaging devices may also be equipped with one or more systems for varying their axes of alignment and/or directions of their respective fields of view. Furthermore, an aerial vehicle may be outfitted with a single track, rail or other system for accommodating the movement of one or more imaging devices, or with two or more of such tracks, rails or other systems.

In accordance with the present disclosure, imaging devices that are configured to vary a baseline distance between them, by relative motion, and images captured by such imaging devices, may be used to determine stereo distance information according to any number of stereo ranging algorithms or techniques. Outputs from such algorithms or techniques may be generated or stored in any form, and used for any purpose. For example, in some embodiments, distances to objects or features in an environment determined according to stereo ranging algorithms or techniques may be aggregated into a depth map that identifies or represents nominal or average distances to such objects or features and tolerances associated with such distances. In some other embodiments, a point cloud or other three-dimensional representation of an environment may be generated and stored in one or more data files. The point cloud may represent positions of each of the points that appear in both of the images of a pair, with pixel-level resolution.

Imaging data (e.g., visual imaging data) may be captured using one or more imaging devices such as digital cameras. Such devices may generally operate by capturing light that is reflected from objects, and by subsequently calculating or assigning one or more quantitative values to aspects of the reflected light, e.g., pixels, generating an output based on such values, and storing such values in one or more data stores. Digital cameras may include one or more sensors having one or more filters associated therewith, and such sensors may detect information regarding aspects of any number of pixels of the reflected light corresponding to one or more base colors (e.g., red, green or blue) of the reflected light. Such sensors may generate data files including such information, e.g., digital images, and store such data files in one or more onboard or accessible data stores (e.g., a hard drive or other like component), as well as one or more removable data stores (e.g., flash memory devices), or displayed on one or more broadcast or closed-circuit television networks, or over a computer network as the Internet.

A digital image is a collection of pixels, typically arranged in an array, which defines an optically formed reproduction of one or more objects, backgrounds or other features of a scene and may be stored in a data file. In a visual image, each of the pixels represents or identifies a color or other light condition associated with a portion of such objects, backgrounds or features. For example, a black-and-white visual image includes a single bit for representing a light condition of the pixel in a binary fashion (e.g., either black or white), while a grayscale visual image may represent the light condition in multiple bits (e.g., two to eight bits for defining tones of gray in terms of percentages or shares of black-and-white), and a color visual image may include groups of bits corresponding to each of a plurality of base colors (e.g., red, green or blue), and the groups of bits may collectively represent a color associated with the pixel. A depth image is also a collection of pixels that defines an optically formed reproduction of one or more objects, backgrounds or other features of a scene, and may also be stored in a data file. Unlike the pixels of a visual image, however, each of the pixels of a depth image represents or identifies not a light condition or color of such objects, backgrounds or features, but a distance to objects, backgrounds or features. For example, a pixel of a depth image may represent a distance between a sensor of an imaging device that captured the depth image (e.g., a depth camera or range sensor) and the respective object, background or feature to which the pixel corresponds.

Imaging data files that are stored in one or more data stores may be printed onto paper, presented on one or more computer displays, or subjected to one or more analyses, such as to identify items expressed therein. Such data files may be stored in any number of formats, including but not limited to JPEG or JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., zooming the imaging device) or the angular orientation (e.g., the roll angle, the pitch angle or the yaw angle), by causing a change in a distance between the sensor and the lens (e.g., optical zoom lenses or digital zoom lenses), a change in a location of the imaging device, or a change in one or more of the angles defining an angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some modern imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Colors may also be expressed according to a six-character hexadecimal model, or # NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as # FFFFFF and #000000, respectively, while the color candy apple red is expressed as #31314A. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

Distances (or depths or ranges) to objects that are represented in a pair of stereo images captured by imaging devices (e.g., digital cameras) having fields of view that overlap, at least partially, may be determined. For each point of each object that appears in both of the images, lines extending from the respective lenses, lens modules or other sensors of the respective imaging devices through representations of the points of the objects in each of the images will virtually intersect at a location corresponding to the actual position of that point, in three-dimensional space. Through the use of traditional geometric principles and properties, e.g., the properties of similar triangles, as well as the known or knowable variables such as baseline distance or separation between the imaging devices, the disparity between the points within the respective images and the focal lengths of the respective imaging devices, coordinates of the intersecting point may be determined accordingly. In some embodiments, the imaging devices may each have the same focal length. In other embodiments, the imaging devices may each have different focal lengths.

Where a point in space appears in two images, e.g., as epipoles, a plane defined by the positions of the respective epipoles within the images and an actual position of the point in space is called an epipolar plane. The images may then be co-aligned based on their contents, e.g., along lines corresponding to intersections of the epipolar plane with the respective image planes, or their respective epipolar lines. After the images have been aligned based on their contents, an actual position of the object may be determined by triangulating lines extending from lenses, lens modules or other sensors of an imaging device through the representations of the points in the respective images within the imaging plane. An intersection of such lines corresponds to the actual position of the point, and a distance to the point may be determined accordingly based on this actual position. Stereo ranging algorithms and techniques may be used to determine ranges or distances to each of the points that appears in both of the images, and such ranges or distances may be used to define a point cloud, a depth map or another three-dimensional model of the environment in which the object is provided. The depth model may be stored in a data file (e.g., a depth image) or utilized for any purpose, including but not limited to navigation, guidance, surveillance or collision avoidance.

Stereo ranging algorithms and techniques thus require determining correspondences of the epipoles in each of the pair of images, with each of the epipoles corresponding to a common point in three-dimensional space. When a plurality of correspondences of epipoles are identified from each of a pair of images of a scene, disparities for each of the conjugate pairs of epipoles may be determined, and a map of such disparities that mimics a three-dimensional structure of the scene may be reconstructed accordingly if information regarding aspects of the scene, e.g., geometric parameters such as the baseline distance or separation, the focal lengths of the imaging devices and others, is known.

There are a number of computer-based stereo ranging algorithms and techniques for determining real-world positions of points expressed in pairs of images of scenes, and for generating depth maps, point clouds or other three-dimensional representations of such scenes based on such positions. Such algorithms or techniques may aid in the performance of calibration, correspondence and/or reconstruction functions. For example, the Open Source Computer Vision (or "OpenCV") library includes a number of computer-based algorithms or other programming functions that are directed to determining distances or ranges from pairs of images. Similarly, a number of other stereo ranging algorithms or techniques programmed in the MATLAB language are publicly available. Computer-based algorithms or techniques are available from a number of other sources, as well.

Imaging devices may be mounted to aerial vehicles horizontally or vertically, e.g., in forward or aft orientations, or in upward or downward orientations, or at any other orientations or angles, which may be relative or absolute. The digital cameras may be homogenous (e.g., functionally equivalent or having the same capacities) or, alternatively, heterogeneous (e.g., having different capacities), and stereo images captured by such cameras for determining depths may be processed in multiple calculations. Images captured by each of the imaging devices may be used for stereo ranging purposes, e.g., by determining baseline distances or separations between such imaging devices, disparities of objects within such images, and focal lengths of the respective imaging devices.

In some embodiments, ranges or distances to objects may be determined using imaging devices that are mounted to fixed structures, not mobile systems (e.g., vehicles). For example, a monitoring system that includes at least a pair of imaging devices may be fixed or mobile in nature, and at least one of the imaging devices may be configured to establish a baseline distance between the imaging devices, e.g., by relative motion. Images captured by the imaging devices may be processed to determine ranges or distances to objects depicted within the images according to one or more stereo ranging algorithms or techniques.

Figure 2:
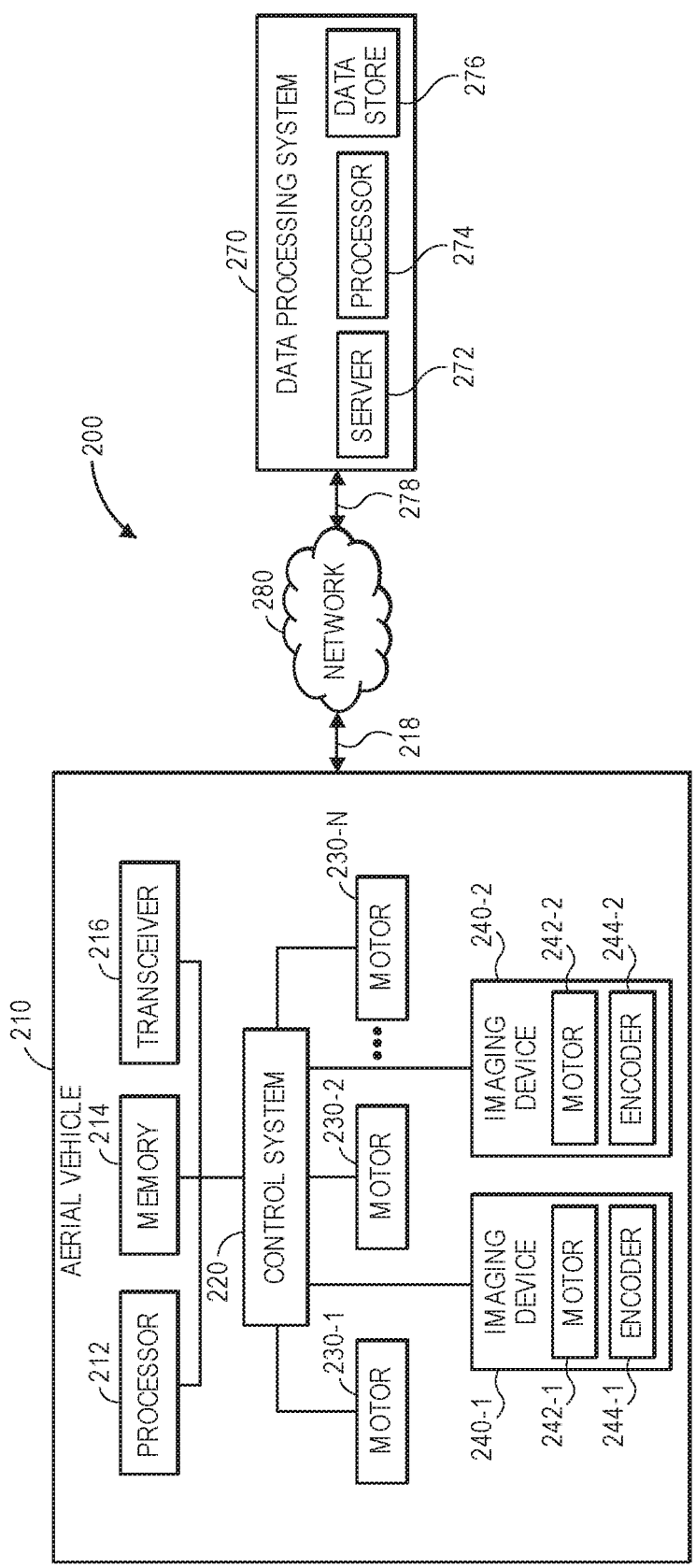
FIG. 2 is a block diagram of one system for determining ranges by imaging devices with dynamic baseline reconfiguration in accordance with embodiments of the present disclosure.

Referring to FIG. 2, a block diagram of one system 200 for determining ranges by imaging devices with dynamic baseline reconfiguration in accordance with embodiments of the present disclosure is shown. The system 200 of FIG. 2 includes an aerial vehicle 210 and a data processing system 270 connected to one another over a network 280, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1I.

The aerial vehicle 210 includes a processor 212, a memory 214 and a transceiver 216. The aerial vehicle 210 further includes a control system 220, a plurality of propulsion motors 230-1, 230-2 . . . 230-n, and a pair of imaging devices 240-1, 240-2.

The processor 212 may be configured to perform any type or form of computing function associated with the operation of the aerial vehicle 210, including but not limited to the execution of one or more stereo ranging algorithms or techniques. The processor 212 may be configured to control any aspects of the operation of the aerial vehicle 210 and the one or more computer-based components thereon, including but not limited to the propulsion motors 230-1, 230-2 . . . 230-n or the imaging devices 240-1, 240-2. For example, the processor 212 may control the operation of one or more control systems or modules, such as the control system 220, for generating instructions for conducting operations of one or more of the propulsion motors 230-1, 230-2 . . . 230-n or the imaging devices 240-1, 240-2. Such control systems or modules may be associated with one or more other computing devices or machines, and may communicate with the data processing system 270 or one or more other computer devices (not shown) over the network 280, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor implementing any of a number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, flight paths, flight control parameters and/or other data items accessible by or to the processor 212. The memory 214 may be implemented using any suitable memory technology, such as static random access memory (SRAM), synchronous dynamic RAM (SDRAM), nonvolatile/Flash-type memory, or any other type of memory. In some embodiments, program instructions, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "WiFi") protocol, such as over the network 280 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 280. For example, in some embodiments, the transceiver 216 may be configured to coordinate I/O traffic between the processor 212 and one or more onboard or external computer devices or components. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling the operation of the aerial vehicle 210 and for engaging with or releasing items, as desired. For example, the control system 220 may be configured to cause or control the operation of one or more of the propulsion motors 230-1, 230-2 . . . 230-n or the imaging devices 240-1, 240-2, such as to cause one or more of the propulsion motors 230-1, 230-2 . . . 230-n to rotate propellers at desired speeds, in order to guide the aerial vehicle 210 along a determined or desired flight path, and to cause one or more of the imaging devices 240-1, 240-2 to capture any imaging data (e.g., still or moving images) as well as any associated audio data and/or metadata. The control system 220 may further control other aspects of the aerial vehicle 210, including but not limited to the operation of one or more control surfaces (not shown) such as wings, rudders, ailerons, elevators, flaps, brakes, slats or other features within desired ranges, or the enactment with or release of one or more items by one or more engagement systems (not shown). In some embodiments, the control system 220 may be integrated with one or more of the processor 212, the memory 214 and/or the transceiver 216.

The propulsion motors 230-1, 230-2 . . . 230-n may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. For example, one or more of the propulsion motors 230-1, 230-2 . . . 230-n may be a brushless direct current (DC) motor such as an outrunner brushless motor or an inrunner brushless motor.

The aerial vehicle 210 may include any number of such propulsion motors 230-1, 230-2 . . . 230-n of any kind. For example, one or more of the propulsion motors 230-1, 230-2 . . . 230-n may be aligned or configured to provide forces of lift to the aerial vehicle 210, exclusively, while one or more of the propulsion motors 230-1, 230-2 . . . 230-n may be aligned or configured to provide forces of thrust to the aerial vehicle 210, exclusively. Alternatively, one or more of the propulsion motors 230-1, 230-2 . . . 230-n may be aligned or configured to provide forces of lift and forces of thrust to the aerial vehicle 210, as needed. For example, the propulsion motors 230-1, 230-2 . . . 230-n may be fixed in their orientation on the aerial vehicle 210, or configured to vary their respective orientations, e.g., a tilt-rotor aircraft. Moreover, the propulsion motors 230-1, 230-2 . . . 230-n may be aligned or configured to operate with different capacities or ratings, or at different speeds, or coupled to propellers having different sizes and shapes.

Each of the propulsion motors 230-1, 230-2 . . . 230-n may be coupled to one or more propellers (or rotors or rotatable systems) having a plurality of shaped blades joined to a hub or boss. For example, each of such propellers may be rotatably mounted to a mast or shaft associated with a respective one of the propulsion motors 230-1, 230-2 . . . 230-n and configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more of the propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

The imaging devices 240-1, 240-2 may be any form of optical recording devices that may be used to photograph or otherwise record imaging data of structures, facilities, terrain or any other elements encountered during operation of the aerial vehicle 210, or for any other purpose. The imaging devices 240-1, 240-2 may include one or more sensors, memory or storage components and processors, and such sensors, memory components or processors may further include one or more photosensitive surfaces, filters, chips, electrodes, clocks, boards, timers, power sources, connectors or any other relevant features (not shown). Such imaging devices 240-1, 240-2 may capture imaging data in the form of one or more still or moving images of any kind or form, as well as any relevant audio signals or other information during the operation of the aerial vehicle 210.

The imaging devices 240-1, 240-2 may communicate with the processor 212 and/or the control system 220, or with one another, by way of a wired or wireless connection that may be dedicated or comprise all or part of an internal network (not shown). Additionally, the imaging devices 240-1, 240-2 may be adapted or otherwise configured to communicate with the data processing system 270 by way of the network 280. Although the block diagram of FIG. 2 includes two boxes corresponding to imaging devices 240-1, 240-2, those of ordinary skill in the pertinent arts will recognize that any number or type of imaging devices may be provided aboard the aerial vehicle 210 in accordance with the present disclosure, including but not limited to digital cameras, depth sensors or range cameras, infrared cameras, radiographic cameras or other optical sensors.

As is shown in FIG. 2, each of the imaging devices 240-1, 240-2 includes a motor 242-1, 242-2 for translating, sliding or otherwise moving the imaging devices 240-1, 240-2 in a predetermined direction or along a predetermined path or axis. The motors 242-1, 242-2 may be any type of device configured to orient or reorient an imaging device, or a housing containing an imaging device, in any direction, including but not limited to a single-phase induction motor of any suitable power rating or torque rating. In some embodiments, one or more of the motors 242-1, 242-2 may be a stepper motor.

The motors 242-1, 242-2 may be mounted or attached to the imaging devices 240-1, 240-2 or, alternatively, provided within a common housing with the imaging devices 240-1, 240-2. In some embodiments, each of the imaging devices 240-1, 240-2 may include an associated one of the motors 242-1, 242-2 to translate, slide or otherwise move the imaging devices 240-1, 240-2 along a predetermined direction or along a predetermined path or axis. In some embodiments, each of the imaging devices 240-1, 240-2 may be configured to further rotate about any axis with respect to their respective mountings, e.g., to yaw, pitch or roll. In other embodiments, one or more of the imaging devices 240-1, 240-2 may be fixed in their respective positions or orientations and need not include a motor.

The motors 242-1, 242-2 may be associated with one or more motors, belts, wheels, gears, drive shafts or other components that permit the respective imaging devices 240-1, 240-2 to translate, slide, or otherwise reposition themselves along a track, a rail or another system, as desired. In some embodiments, one or more of the motors 242-1, 242-2 may be provided in association with a track, a rail or another system for accommodating motion of the imaging devices 240-1, 240-2 therein. For example, the motors 242-1, 242-2 may be configured to engage with corresponding portions of housings or other aspects of the imaging devices 240-1, 240-2, and to cause the imaging devices 240-1, 240-2 to be repositioned thereby.

Additionally, as is also shown in FIG. 2, each of the imaging devices 240-1, 240-2 may include an encoder 244-1, 244-2 for determining positions of the imaging devices 240-1, 240-2 in absolute or relative terms with respect to one another. For example, the encoders 244-1, 244-2 may include any sensors, transducers or other components for determining positions of the imaging devices 240-1, 240-2 by magnetic, optical, sonic or any other type of means. In some embodiments, the encoders 244-1, 244-2 may be magnetic encoders having one or more scales (e.g., for a linear magnetic encoder) or discs (e.g., for a rotary magnetic encoder), sensors and circuits for detecting changes in magnetic fields and converting such fields to signals representative of positions of the imaging devices 240-1, 240-2. In some other embodiments, the encoders 244-1, 244-2 may be optical encoders having one or more light sources (e.g., light-emitting diodes, or LEDs) and one or more linear or rotary components featuring shutters or other openings that alternatively allow light to pass therethrough, or block light from passing therethrough. The encoders 244-1, 244-2 may further include one or more photodetectors for sensing alternating light patterns and converting such patterns into electrical signals indicative of positions of the imaging devices 240-1, 240-2.

In addition to the imaging devices 240-1, 240-2, the aerial vehicle 210 may also include any number of other sensors, components or other features for controlling or aiding in the operation of the aerial vehicle 210, including but not limited to one or more environmental or operational sensors for determining one or more attributes of an environment in which the aerial vehicle 210 is operating, or may be expected to operate, including extrinsic information or data or intrinsic information or data. For example, the aerial vehicle 210 may include one or more Global Positioning System ("GPS") receivers or sensors, compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones, piezoelectric sensors, vibration sensors or other transducers for detecting and recording acoustic energy from one or more directions).

The data processing system 270 includes one or more physical computer servers 272 having one or more computer processors 274 and any number of data stores 276 (e.g., databases) associated therewith, as well as provided for any specific or general purpose. For example, the data processing system 270 of FIG. 2 may be independently provided for the exclusive purpose of receiving, analyzing or storing imaging data or other information or data received from the aerial vehicle 210 or, alternatively, provided in connection with one or more physical or virtual services configured to receive, analyze or store such imaging data or other information or data, as well as one or more other functions. The servers 272 may be connected to or otherwise communicate with the processors 274 and the data stores 276, which may store any type of information or data, including but not limited to acoustic signals, information or data relating to imaging data, or information or data regarding environmental conditions, operational characteristics, or positions, for any purpose. The servers 272 and/or the computer processors 274 may also connect to or otherwise communicate with the network 280, as indicated by line 278, through the sending and receiving of digital data. For example, the data processing system 270 may include any facilities, stations or locations having the ability or capacity to receive and store information or data, such as media files, in one or more data stores, e.g., media files received from the aerial vehicle 210, or from one another, or from one or more other external computer systems (not shown) via the network 280. In some embodiments, the data processing system 270 may be provided in a physical location. In other such embodiments, the data processing system 270 may be provided in one or more alternate or virtual locations, e.g., in a "cloud"-based environment. In still other embodiments, the data processing system 270 may be provided onboard one or more aerial vehicles, including but not limited to the aerial vehicle 210.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 and/or the data processing system 270 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the aerial vehicle 210 may be adapted to transmit information or data in the form of synchronous or asynchronous messages to the data processing system 270 or to any other computer device (e.g., to one or more other aerial vehicles) in real time or in near-real time, or in one or more offline processes, via the network 280. Those of ordinary skill in the pertinent art would recognize that the aerial vehicle 210 or the data processing system 270 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212 or the processor 274, or any other computers or control systems utilized by the aerial vehicle 210 or the data processing system 270 (e.g., by one or more other aerial vehicles), and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
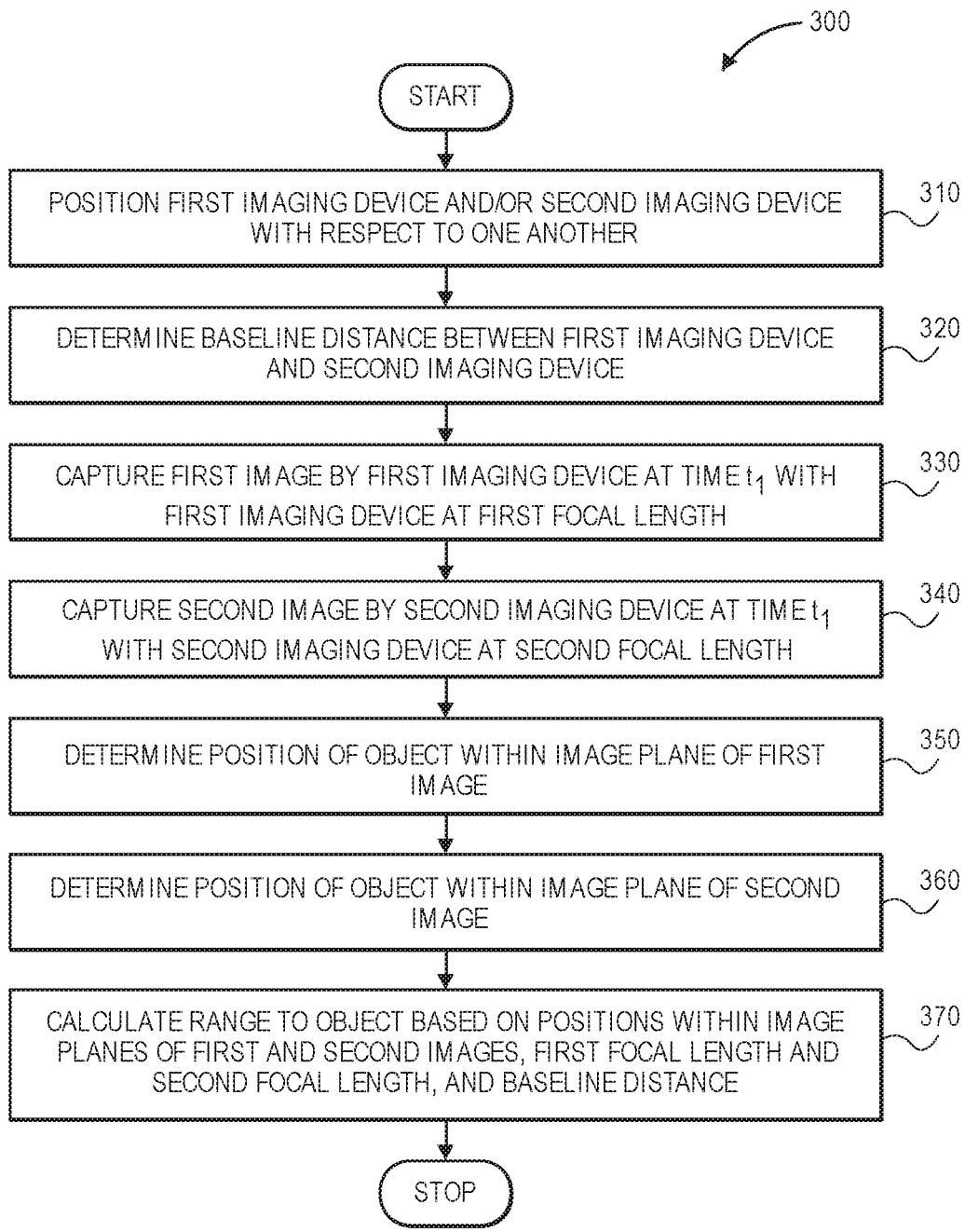
FIG. 3 is a flow chart of one process for determining ranges by imaging devices with dynamic baseline reconfiguration in accordance with embodiments of the present disclosure.

As is discussed above, an aerial vehicle may include imaging devices that are configured to translate, slide or otherwise move in order to establish a baseline distance between them, and to determine a range or distance to one or more airborne or ground-based objects based on images captured thereby, e.g., according to one or more stereo ranging algorithms or techniques. Images captured by the imaging device may be processed by stereo ranging algorithms or techniques to determine ranges to any objects that are expressed in each of the images. Referring to FIG. 3, a flow chart 300 of one process for determining ranges by imaging devices with dynamic baseline reconfiguration in accordance with embodiments of the present disclosure is shown.

At box 310, a first imaging device and a second imaging device are positioned with respect to one another. For example, referring again to FIGS. 1A and 1B, one or more of the first imaging device 140-1 or the second imaging device 140-2 may be repositioned to a location along the track 146 in order to establish a desired baseline distance b between one another. In some embodiments, the first imaging device and the second imaging device may be configured for independent translation, sliding or motion with respect to one another. In some other embodiments, one of the first imaging device and the second imaging device may be fixed in position, while another of the first imaging device and the second imaging device may be configured for independent translation, sliding or motion. Alternatively, the first imaging device and/or the second imaging device may be configured to further rotate about any axis with respect to their respective mountings, e.g., to yaw, pitch or roll.

At box 320, a baseline distance between the first imaging device and the second imaging device is determined. In some embodiments, one or both of the first imaging device and the second imaging device may include an encoder for determining their respective positions, e.g., according to any type or form of coordinate system or position standard, and the baseline distance may be determined based on such positions. In some embodiments, the encoder may be any type of magnetic, optical, sonic or other form of position sensor.

At box 330, a first image is captured by the first imaging device at a time $t_1$, with the first imaging device configured at a first focal length, and at box 340, a second image is captured by the second imaging device at a time $t_1$, with the second imaging device configured at a second focal length. In some embodiments, the operation of the first imaging device and the second imaging device may be synchronized such that the first image and the second image are captured simultaneously, or nearly simultaneously, e.g., at approximately the time $t_1$. In some embodiments, each of the first imaging device and the second imaging device may be configured to capture streams of image frames in series, and the first image and the second image may be identified as having been captured at the time $t_1$ by time stamps or other records. In some embodiments, the first imaging device and the second imaging device may be programmed to begin capturing one or more images automatically, upon an arrival of the aerial vehicle at a given location, upon the aerial vehicle reaching a given speed or a given altitude, upon sensing one or more objects (e.g., collision risks) nearby, upon detecting any predetermined environmental or operating condition, or for any other reason.

At box 350, a position of an object within an image plane of the first image is determined, and at box 360, a position of the object within an image plane of the second image is determined. For example, each of the first image and the second image may be subjected to one or more content-based analyses to identify attributes of any points of the object that are represented in either or both of the first image and the second image, including but not limited to any number of edges, contours, outlines, colors, textures, silhouettes, shapes or other characteristics of the object, or portions of the object, expressed therein using one or more algorithms or machine-learning tools. Some such algorithms or tools may include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts. In some embodiments, an object may be identified in one of the first image or the second image, and a search may be conducted for the object in another of the images. In some embodiments, epipolar lines of the respective images may be rectified using one or more transformations, in order to align the epipolar lines with scan lines of the images, thereby facilitating a search for an object that was identified in one of the images in the other of the images. Thereafter, pixels corresponding to points of the object in one image may be identified in the other of the images, e.g., by matching pixels between the respective images, until the object is identified.

At box 370, a range to the object is calculated based on the positions of the object within the image planes of the first image and the second image, the first focal length and the second focal length, and a baseline distance between the positions of the object, and the process ends. For example, range data to the object may be calculated based on a disparity in the positions of the object within the first image and the second image, a baseline distance between the imaging devices at time $t_1$, and focal lengths of the imaging devices according to one or more stereo algorithms and/or techniques. As is noted above, a disparity is defined as a separation of a given point appearing within two images of the same scene, while a baseline distance is a distance between positions of imaging devices when the first image and the second image were captured (e.g., at time $t_1$, or approximately time $t_1$) and a focal length of an imaging device is a distance between a sensor and a lens within the imaging device. Stereo ranging algorithms or techniques may use the disparity, the baseline distance and the focal length in order to determine a range or a distance to an object, or ranges or distances to one or more aspects of the object. The range data may be utilized for any purpose, e.g., for navigation, guidance, surveillance, collision avoidance, or any other purpose.

As is discussed above, the systems and methods of the present disclosure include imaging devices that are configured to dynamically reconfigure their baseline distances or separations, e.g., by relative motion between the imaging devices. In some embodiments, the imaging devices may be mounted to aerial vehicles and configured to determine ranges or distances to ground-based or airborne structures.

Figure 4:
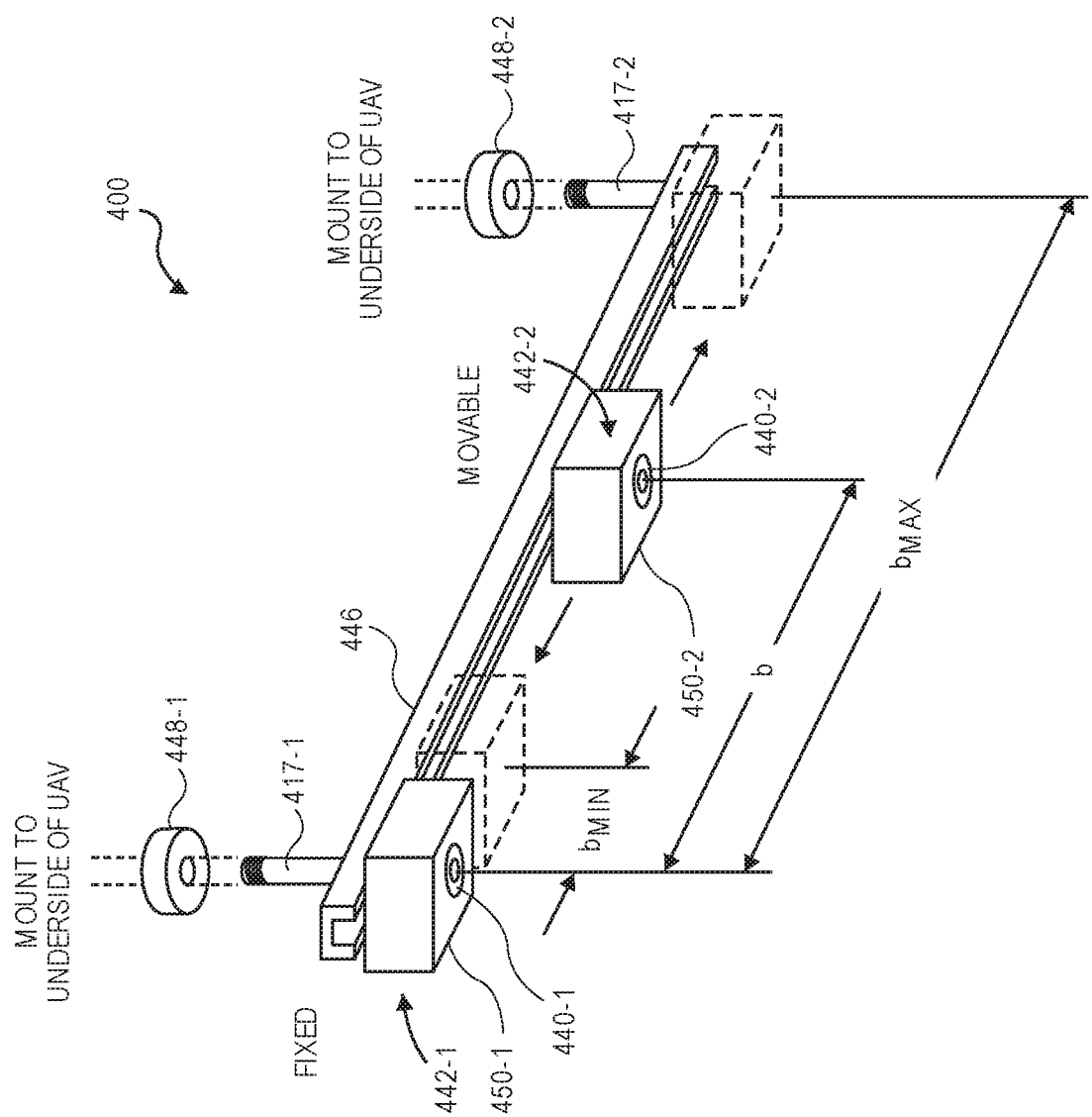
FIG. 4 is a view of one system for determining ranges by imaging devices with dynamic baseline reconfiguration in accordance with embodiments of the present disclosure.

Referring to FIG. 4, a view of one system for determining ranges by imaging devices with dynamic baseline reconfiguration in accordance with embodiments of the present disclosure is shown. Except where otherwise noted, reference numerals preceded by the number "4" shown in FIG. 4 indicate components or features that are similar to components or features having reference numerals preceded by the number "2" shown in FIG. 2 or by the number "1" shown in FIGS. 1A through 1I.

As is shown in FIG. 4, a system 400 includes a pair of imaging devices 440-1, 440-2 that are mounted in association with a track 446. Each of the imaging devices 440-1, 440-2 is disposed within a housing 450-1, 450-2. The housings 450-1, 450-2 may house any number of lenses, sensors, memory or storage components and processors of the imaging devices 440-1, 440-2, and such lenses, sensors, memory components or processors may further include one or more photosensitive surfaces, filters, chips, electrodes, clocks, boards, timers, power sources, connectors or any other relevant features of the imaging devices 440-1, 440-2. Although the housings 450-1, 450-2 are shown as having substantially rectangular shapes, the housings 450-1, 450-2 may take any shape or form, and may have any number of flat or rounded shapes featuring straight and/or curvilinear edges.

As is also shown in FIG. 4, the housing 450-1 is fixed in its position near one end of the track 446. The housing 450-2 is movable along an axis or in directions defined by the track 446, and may include one or more motors 442-2 disposed within the housing 450-2. In some embodiments, the housings 450-1, 450-2 may be formed from any suitable materials, e.g., plastics, metals, composites or any other combinations of materials. In some embodiments, the track 446 may be formed from sufficiently durable materials such as aluminum, titanium or other metals having sufficiently high strength-to-weight ratios, as well as any composites or other non-metallic components. Additionally, the housing 450-1 or the track 446 may include any number of bearings or other components or substances for reducing or managing any friction between the housings 450-1 and the track 446.

The system 400 is configured to dynamically reconfigure a baseline distance b between the lenses or sensors of the imaging devices 440-1, 440-2. In particular, the baseline distance b may have a range between a minimum baseline distance $b_{MIN}$, with a minimum separation provided between the housings 450-1, 450-2, near an end of the track 446 at which the housing 450-1 is fixed, and a maximum baseline distance $b_{MAX}$, with the housing 450-2 positioned at or near an opposite end of the track 446.

Thus, the system 400 may be used to determine ranges or distances to one or more objects with enhanced accuracy by varying the baseline distance b between the imaging devices 440-1, 440-2. For example, the imaging devices 440-1, 440-2 may capture images with varying baseline distances between a range of $b_{MIN}$ and $b_{MAX}$, and evaluate each of the images to determine whether such images include objects or to calculate ranges or distances to such objects.

The system 400 is configured for mounting beneath an aerial vehicle. For example, as is shown in FIG. 4, the track 446 includes a pair of fasteners 417-1, 417-2 (e.g., bolts, screws or other fasteners) that may be joined to an underside of an aerial vehicle (not shown). Additionally, a pair of vibration-dampening or shock-absorbing mounts 448-1, 448-2 may be provided between the track 446 and the underside of the aerial vehicle in order to minimize the effects of any vibrations or shocks on the operation of the imaging devices 440-1, 440-2.

As is shown in FIG. 4, the imaging devices 440-1, 440-2 are oriented vertically downward, e.g., to capture imaging data from fields of view that extend below the track 446 and/or an aerial vehicle to which the system 400 is mounted. Thus, the system 400 is configured to determine distances to objects (e.g., ground-based surfaces or other airborne objects) below the system 400. Alternatively, the imaging devices 440-1, 440-2 may be oriented at any angle with respect to the track 446, and may be used to capture images and determine ranges or distances to objects in any direction with respect to the track 446 or an aerial vehicle to which the system 400 is mounted.

Figure 5A:
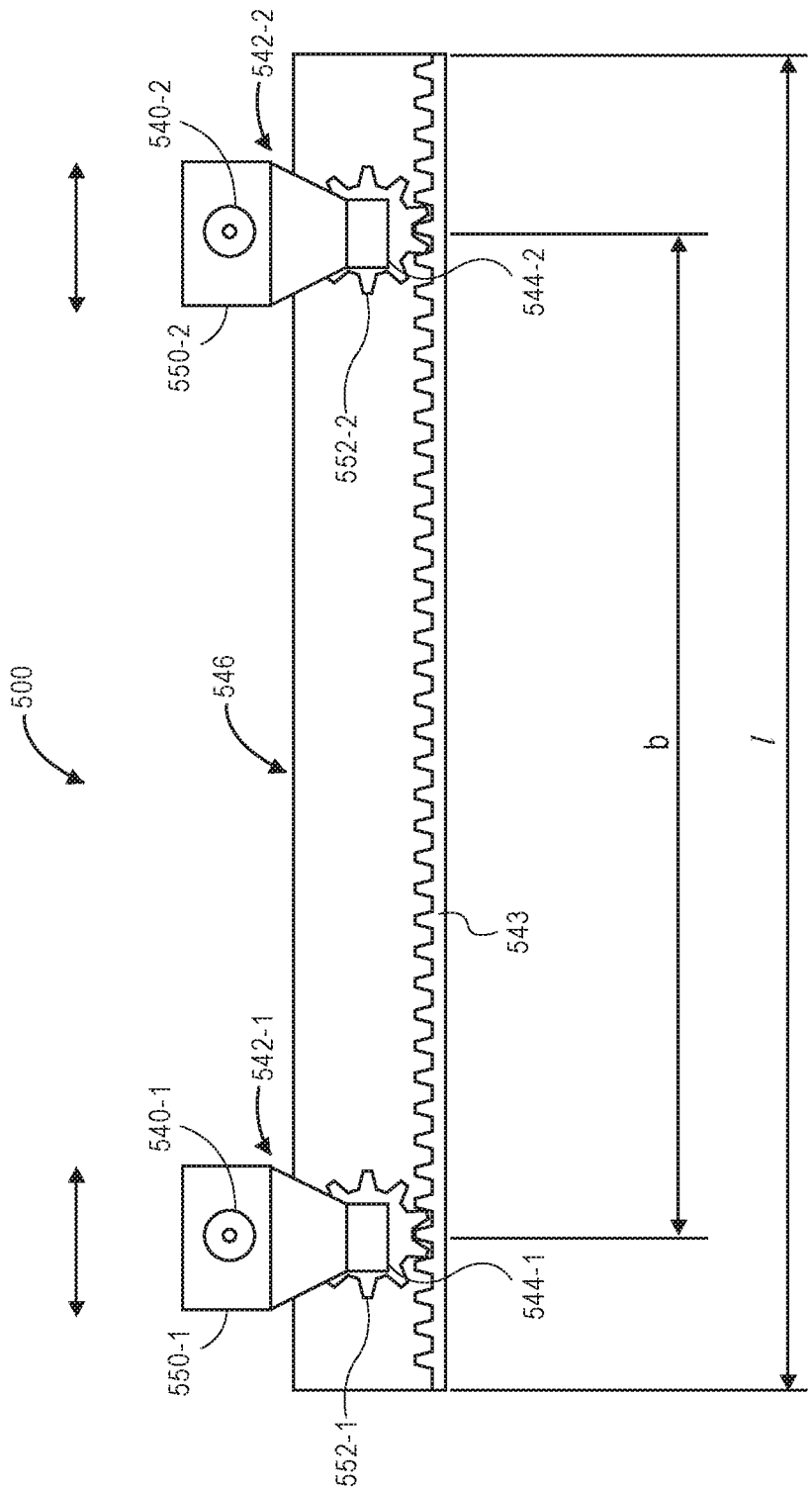
FIGS. 5A, 5B and 5C are views of aspects of one system for determining ranges by imaging devices with dynamic baseline reconfiguration in accordance with embodiments of the present disclosure.
Figure 5B:
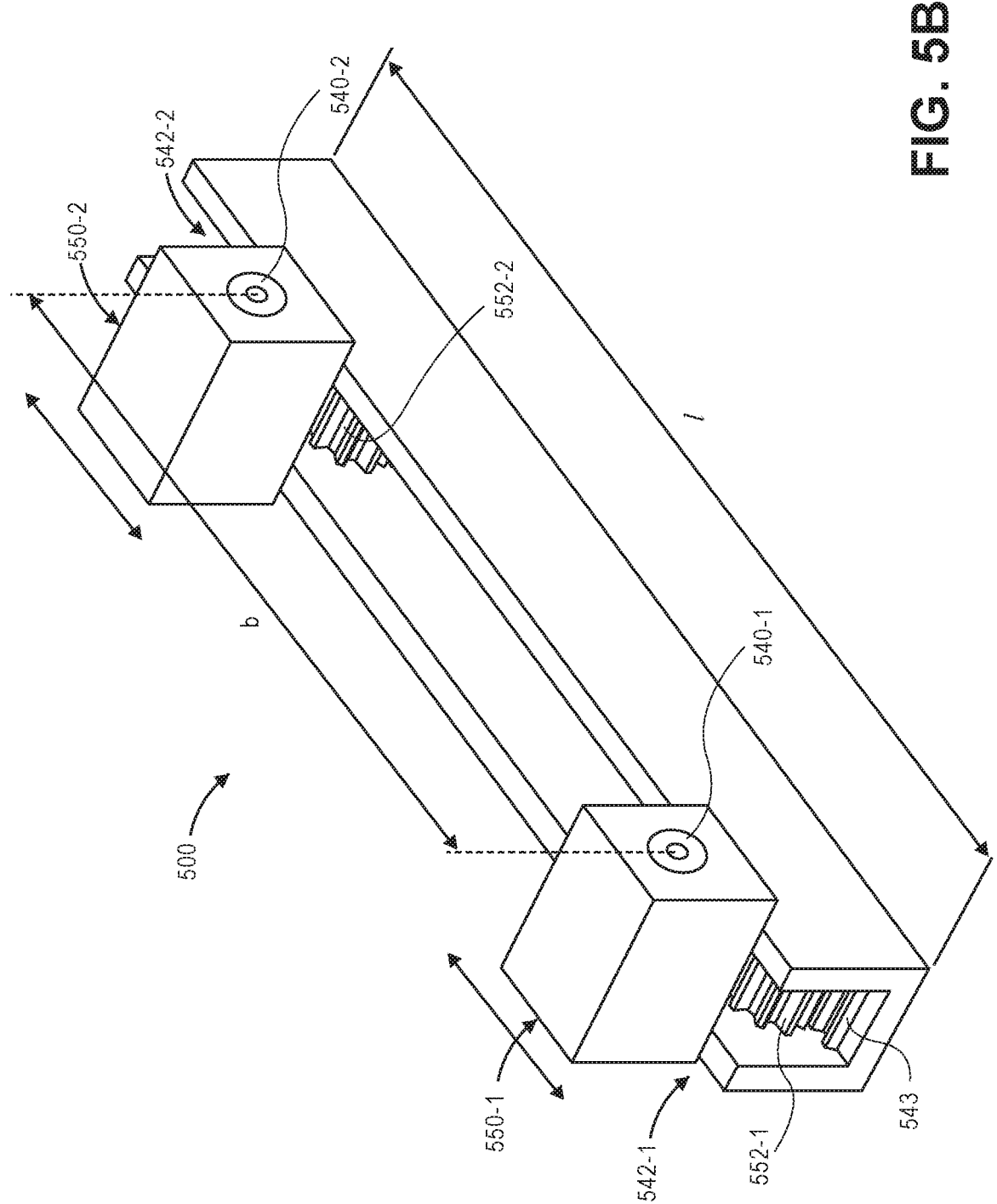
Figure 5C:
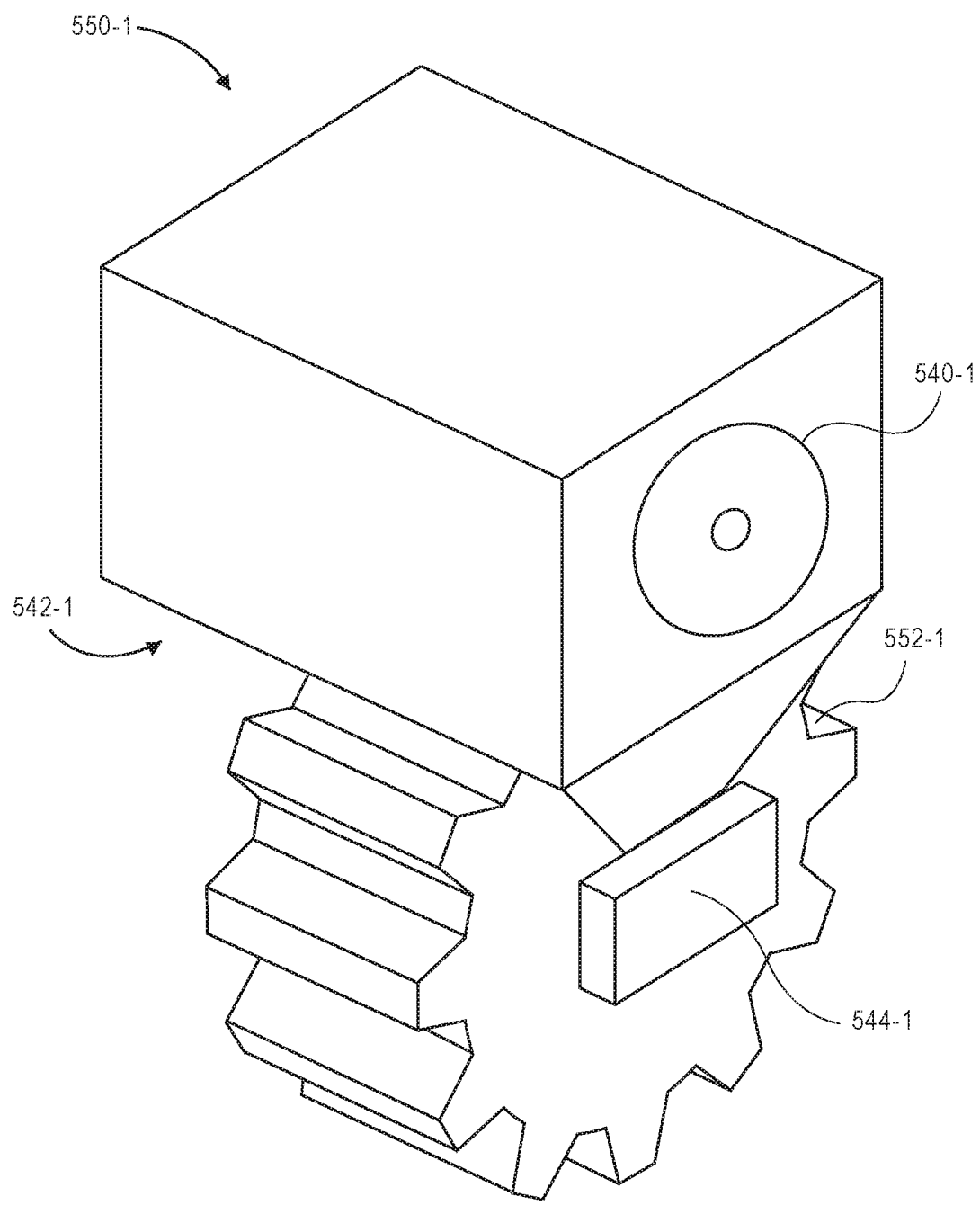

As is discussed above, the systems and methods of the present disclosure may include one or more imaging devices that are configured to translate, slide or otherwise move on or in association with a track, a rail or another system, in order to establish a baseline distance between the imaging devices. Referring to FIGS. 5A, 5B and 5C, views of aspects of one system for determining ranges by imaging devices with dynamic baseline reconfiguration in accordance with embodiments of the present disclosure is shown. Except where otherwise noted, reference numerals preceded by the number "5" shown in FIGS. 5A through 5C indicate components or features that are similar to components or features having reference numerals preceded by the number "4" shown in FIG. 4, by the number "2" shown in FIG. 2 or by the number "1" shown in FIGS. 1A through 1I.

As is shown in FIGS. 5A through 5C, a system 500 includes a pair of imaging devices 540-1, 540-2 that are configured to translate within a track 546 having a length 1. The imaging devices 540-1, 540-2 are disposed within housings 550-1, 550-2 having motors 542-1, 542-2 and spur gears 552-1, 552-2. The motors 542-1, 542-2 are independently configured to cause the respective spur gears 552-1, 552-2 to rotate about shafts within the housings 552-1, 552-2 that are aligned transverse to an axis of the track 546, in a clockwise or counter-clockwise direction. The track 546 shown in FIGS. 5A and 5B is a single segment or unit for accommodating the motion of the housings 550-1, 550-2. Alternatively, the track 546 may include two segments or units, with each of the housings 550-1, 550-2 being configured to translate within the respective segments or units.

The spur gears 552-1, 552-2 mate with a gear rack 543 within the track 546, such that rotating the spur gears 552-1, 552-2 about their respective shafts causes the housings 550-1, 550-2 to translate in either direction along the axis of the track 546. Alternatively, instead of spur gears 552-1, 552-2, the housings 550-1, 550-2 may include one or more wheels, and instead of the gear rack 543, the track 546 may further include one or more correspondingly flat and sufficiently durable surfaces for accommodating the rotation of the one or more wheels thereon. The rotation of the spur gears 552-1, 552-2 may be used to establish a baseline distance b between the lenses or sensors of the imaging devices 540-1, 540-2.

Additionally, each of the housings 550-1, 550-2 further includes an encoder 544-1, 544-2. Based on signals that are transmitted or received by the encoder 544-1, 544-2, positions of the housings 550-1, 550-2 and/or the imaging devices 540-1, 540-2 along the track 546 may be determined.

Any type or form of encoder or position-determining system may be utilized in accordance with the systems and methods of the present disclosure, including but not limited to magnetic encoders (e.g., linear magnetic encoders or rotary magnetic encoders), optical encoders, sonic encoders, laser encoders, or any other type of systems or components.

Referring to FIG. 6, a view of aspects of one system for determining ranges by imaging devices with dynamic baseline reconfiguration in accordance with embodiments of the present disclosure is shown. Except where otherwise noted, reference numerals preceded by the number "6" shown in FIG. 6 indicate components or features that are similar to components or features having reference numerals preceded by the number "5" shown in FIGS. 5A through 5C, by the number "4" shown in FIG. 4, by the number "2" shown in FIG. 2 or by the number "1" shown in FIGS. 1A through 1I.

As is shown in FIG. 6, a system 600 includes an imaging device 640 and a track 646. The imaging device 640 is disposed within a housing 650 that is configured to dynamically translate along the track 646, e.g., by one or more motors or other systems. The imaging device 640 is aligned to capture imaging data in a direction that is lateral, or transverse, to an axis of the track 646.

The housing 650 further includes an encoder 644 provided on one external side. The encoder 644 may include one or more magnetoresistive pickup elements. The track 646 further includes a linear magnet 648 aligned within the track 646 along a side corresponding to the encoder 644. The linear magnet 648 may include a plurality of magnets of alternating (i.e., reversed) polarity along its length. The linear magnet 648 may include any number of magnets and may take any form or have any dimensions. For example, the linear magnet 648 may be a flexible magnetic tape applied to an inner surface of the track 646. The dimensions of the linear magnet 648 may, but need not, be to scale. As the housing 640 translates within the track 646, the encoder 644 passes within a vicinity of the linear magnet 648 and determines a position of the housing 640 based on variations in the magnetic fields B, as sensed by the encoder 644.

Although the system 600 of FIG. 6 includes only a single imaging device 640, the system 600 may include any number of fixed or movable imaging devices in accordance with the present disclosure.

Figure 7:
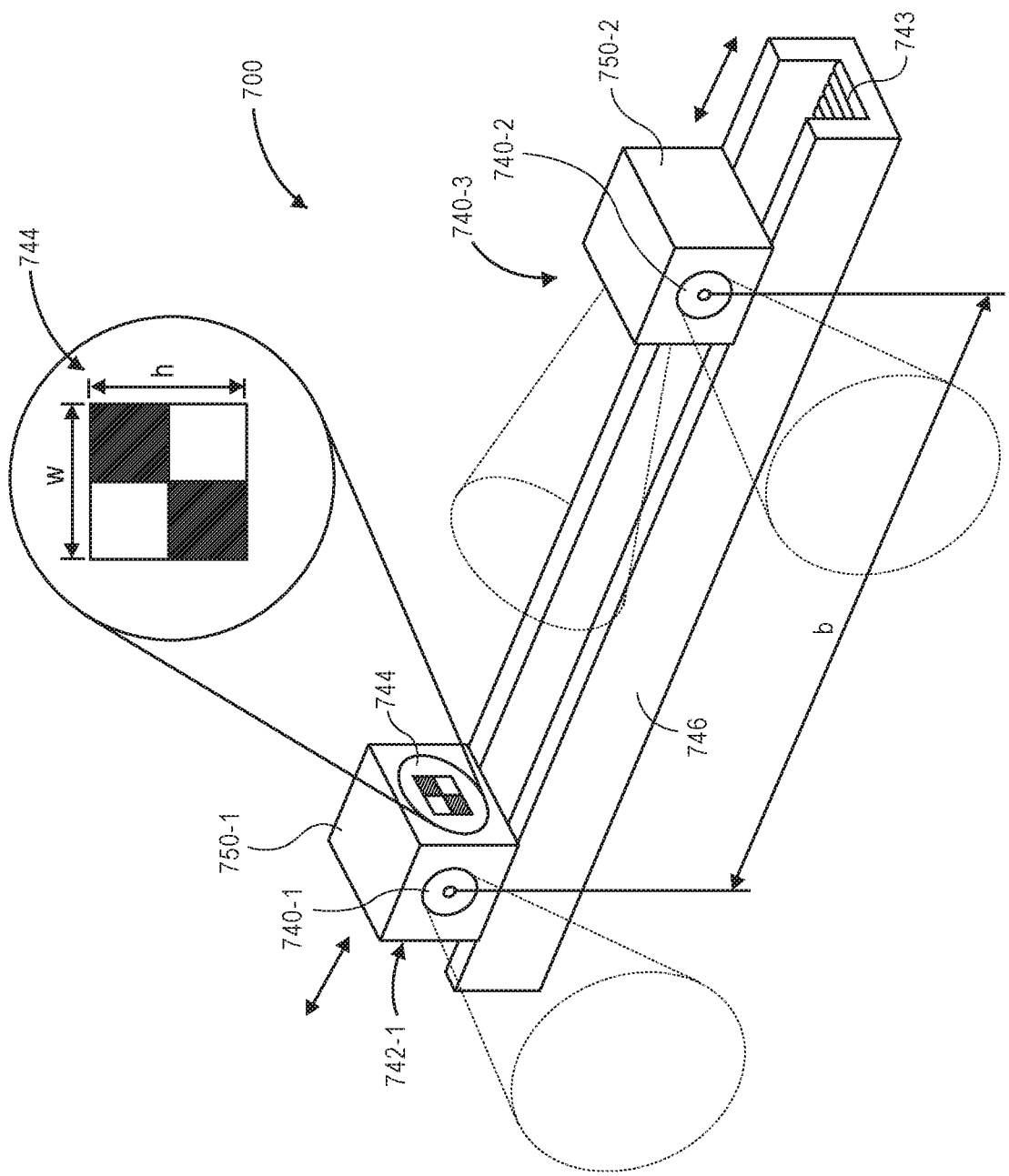
FIG. 7 is a view of aspects of one system for determining ranges by imaging devices with dynamic baseline reconfiguration in accordance with embodiments of the present disclosure.

Referring to FIG. 7, a view of aspects of one system for determining ranges by imaging devices with dynamic baseline reconfiguration in accordance with embodiments of the present disclosure is shown. Except where otherwise noted, reference numerals preceded by the number "7" shown in FIG. 7 indicate components or features that are similar to components or features having reference numerals preceded by the number "6" shown in FIG. 6, by the number "5" shown in FIGS. 5A through 5C, by the number "4" shown in FIG. 4, by the number "2" shown in FIG. 2 or by the number "1" shown in FIGS. 1A through 1I.

As is shown in FIG. 7, a system 700 includes a pair of imaging devices 740-1, 740-2 and a track 746. The imaging devices 740-1, 740-2 are each disposed within housings 750-1, 750-2 that are configured to dynamically translate along the track 746, e.g., by one or more motors or other systems. The imaging devices 740-1, 740-2 are each aligned to capture imaging data in directions that are lateral, or transverse, to an axis of the track 746, and overlap on a left side of the track 746. Additionally, the track 746 includes a gear rack 743 for mating with one or more gears (not shown), e.g., spur gears, of the housings 750-1, 750-2.

The housing 750-1 includes a fiducial marking 744 having a width w and a height h disposed on one side of the housing 750-1. The fiducial marking 744 includes sections having alternating colors or textures provided thereon. Alternatively, the fiducial marking 744 may include one or more alphanumeric characters, symbols or bar codes (e.g., one-dimensional or two-dimensional bar codes, such as "QR" codes).

Additionally, the housing 750-2 further includes an auxiliary imaging device 740-3 aligned to capture imaging data in a direction that is parallel to the axis of the track 746. The auxiliary imaging device 740-3 may have the same attributes, features and/or capacities of either of the imaging devices 740-1, 740-2, or may have one or more different attributes, features and/or capacities. A field of view of the auxiliary imaging device 740-3 includes a side of the housing 750-1 that has the fiducial marking 744 provided thereon. Accordingly, a baseline distance b between the lenses or sensors of the imaging devices 740-1, 740-2 may be measured by capturing images of the fiducial marking 744 using the auxiliary imaging device 740-3 and interpreting such images to determine the baseline distance b based on the known width w and height h of the fiducial marking 744.

Alternatively, the housing 750-1 may also include an additional auxiliary imaging device (not shown) that is aligned to include the housing 750-2 within a field of view, and the housing 750-2 may further include one or more additional fiducial markings (not shown) provided thereon. The additional auxiliary imaging device may be used to determine an alternate measurement of the baseline distance b, e.g., for redundancy, or as a check of a measurement of the baseline distance b determined using the auxiliary imaging device 740-3 based on the fiducial marking 744.

Figure 8:
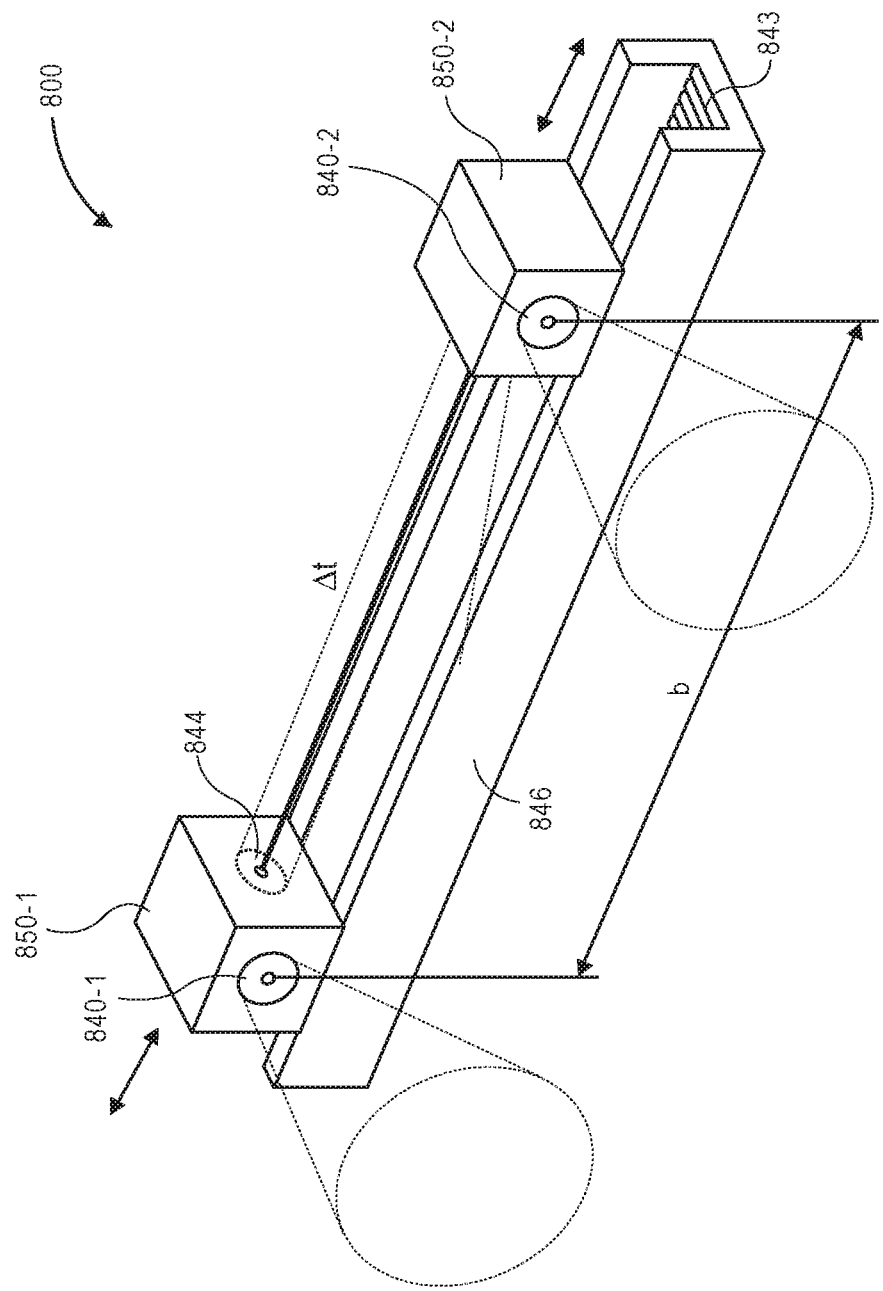
FIG. 8 is a view of aspects of one system for determining ranges by imaging devices with dynamic baseline reconfiguration in accordance with embodiments of the present disclosure.

Referring to FIG. 8, a view of aspects of one system for determining ranges by imaging devices with dynamic baseline reconfiguration in accordance with embodiments of the present disclosure is shown. Except where otherwise noted, reference numerals preceded by the number "8" shown in FIG. 8 indicate components or features that are similar to components or features having reference numerals preceded by the number "7" shown in FIG. 7, by the number "6" shown in FIG. 6, by the number "5" shown in FIGS. 5A through 5C, by the number "4" shown in FIG. 4, by the number "2" shown in FIG. 2 or by the number "1" shown in FIGS. 1A through 1I.

As is shown in FIG. 8, a system 800 includes a pair of imaging devices 840-1, 840-2 and a track 846. The imaging devices 840-1, 840-2 are each disposed within housings 850-1, 850-2 that are configured to dynamically translate along the track 846, e.g., by one or more motors or other systems. The imaging devices 840-1, 840-2 are each aligned to capture imaging data in directions that are lateral, or transverse, to an axis of the track 846, and overlap on a left side of the track 846. Additionally, the track 846 includes a gear rack 843 for mating with one or more gears (not shown), e.g., spur gears, of the housings 850-1, 850-2.

The housing 850-1 includes a laser range finder 844 (or other laser ranging system) aligned to emit one or more laser beams or signals in a direction that is parallel to the axis of the track 846, toward the housing 850-2. The laser range finder 844 may include a laser device configured to emit one or more laser beams or signals, and to determine a baseline distance b between the lenses or sensors of the imaging devices 840-1, 840-2 based on a time-of-flight (or an elapsed time) Δt between the emission of such beams or signals and the capture of such beams or signals reflected from the housing 850-2. The baseline distance b may also be determined based on offsets associated with distances between sides of the housings 850-1, 850-2 and the respective lenses or sensors of the imaging devices 840-1, 840-2.

Alternatively, the housing 850-1 may also include an additional laser range finder (not shown) that is aligned to emit one or more laser beams or signals toward the housing 850-1. The additional laser range finder may be used to determine an alternate measurement of the baseline distance b, e.g., for redundancy, or as a check of a measurement of the baseline distance b determined using the laser range finder 844.

As is discussed above, the systems and methods of the present disclosure may be utilized to determine distances to airborne and ground-based objects. In some embodiments, a pair of imaging devices may be mounted to an underside of an aerial vehicle and aligned in a vertically downward direction. An altitude of the aerial vehicle may be determined, e.g., during a descent or an ascent, or a hovering operation, based on images captured using the imaging devices according to one or more stereo ranging algorithms or techniques. The baseline distance or separation between the imaging devices may be varied during the descent or the ascent, or the hovering operation, to enhance the accuracy of altitude determinations based on images captured by the imaging devices.

Figure 9A:
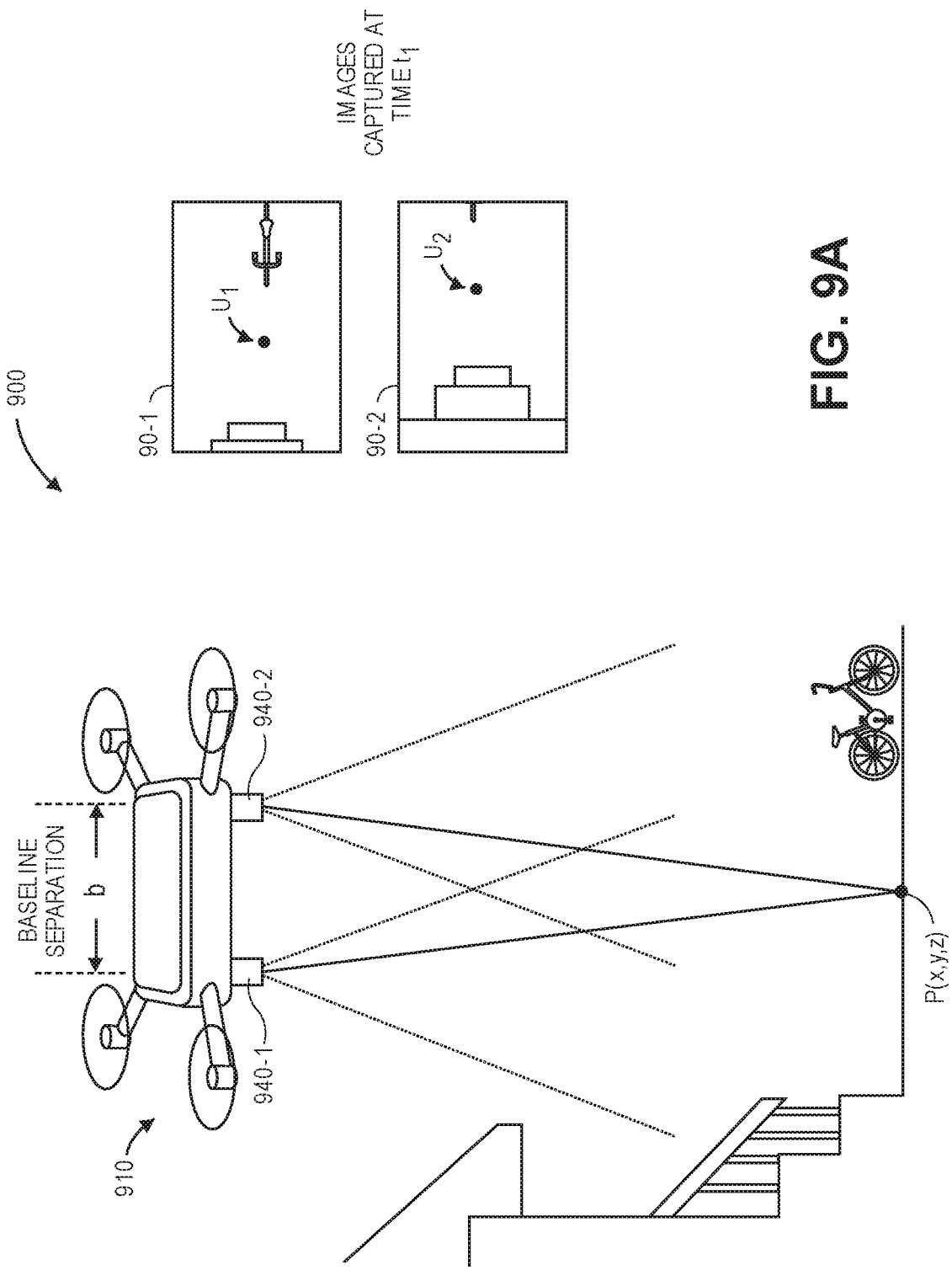
FIGS. 9A through 9C are views of aspects of one system for determining ranges by imaging devices with dynamic baseline reconfiguration in accordance with embodiments of the present disclosure.
Figure 9B:
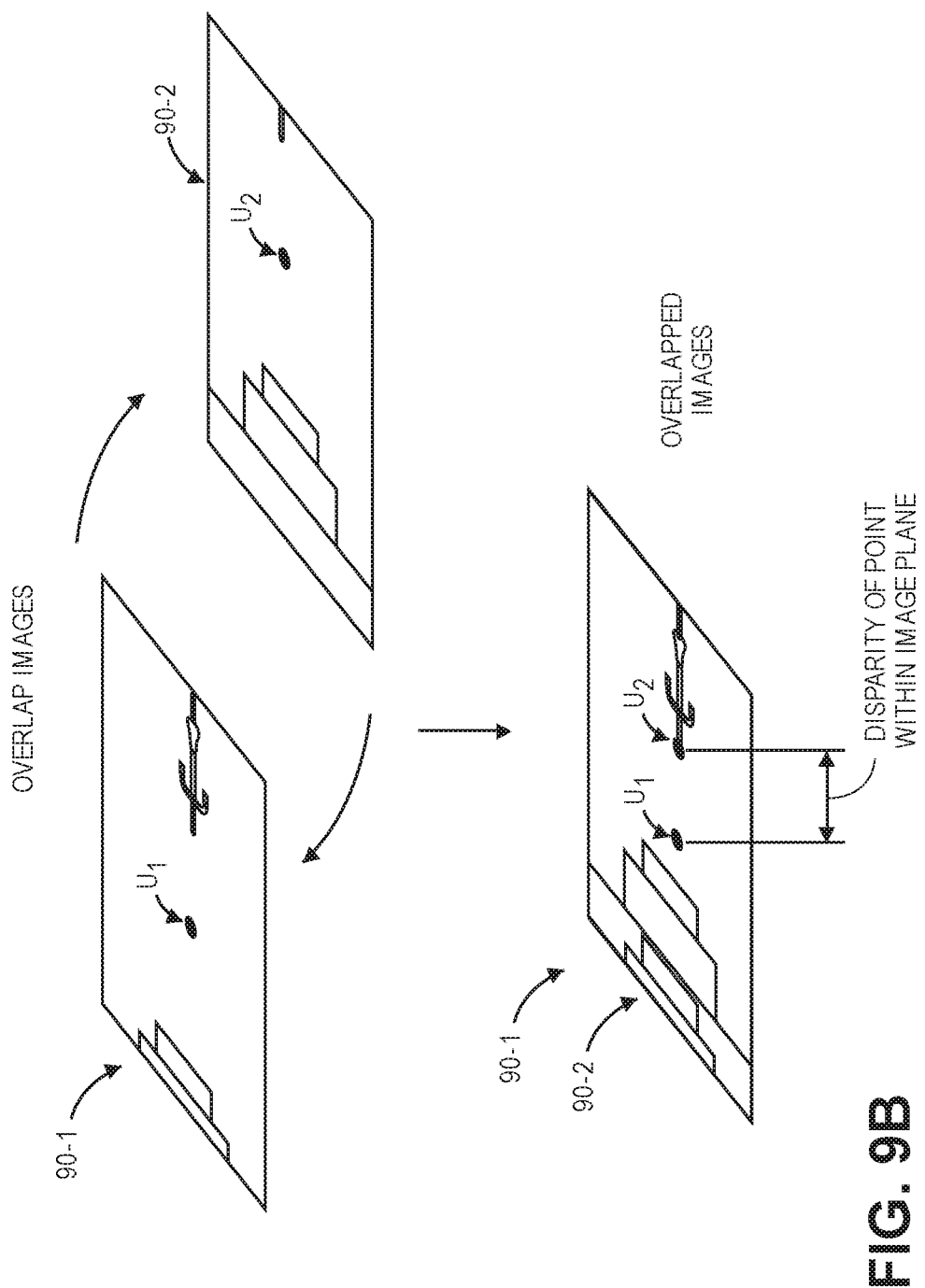
Figure 9C:
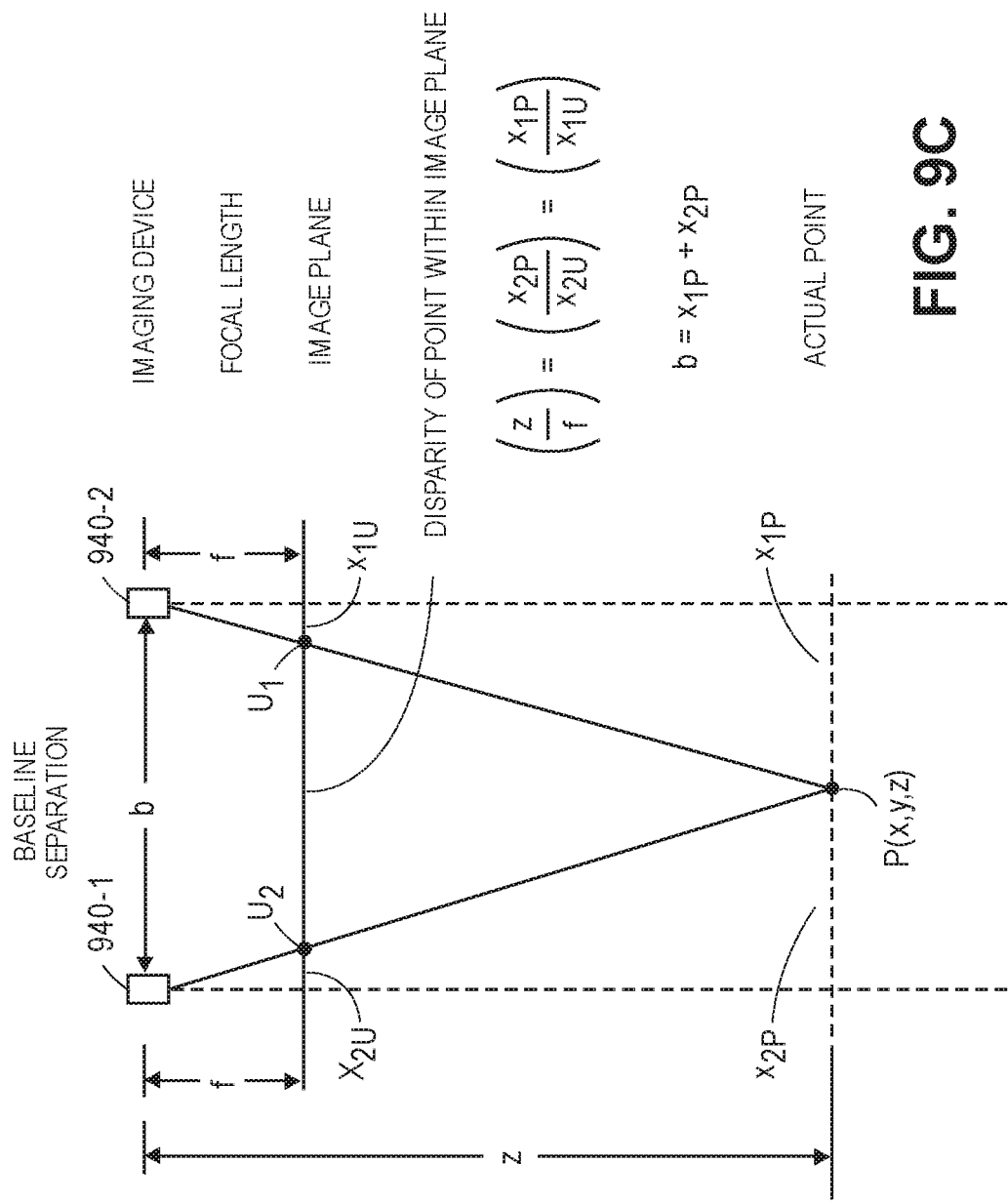

Referring to FIGS. 9A through 9C, a view of aspects of one system for determining ranges by imaging devices with dynamic baseline reconfiguration in accordance with embodiments of the present disclosure is shown. Except where otherwise noted, reference numerals preceded by the number "9" shown in FIGS. 9A through 9C indicate components or features that are similar to components or features having reference numerals preceded by the number "8" shown in FIG. 8, by the number "7" shown in FIG. 7, by the number "6" shown in FIG. 6, by the number "5" shown in FIGS. 5A through 5C, by the number "4" shown in FIG. 4, by the number "2" shown in FIG. 2 or by the number "1" shown in FIGS. 1A through 1I.

As is shown in FIG. 9A, an aerial vehicle 910 having a pair of imaging devices 940-1, 940-2 mounted to an underside of the aerial vehicle 910 is shown. One or both of the imaging devices 940-1, 940-2 may be configured to translate, slide or otherwise move along a track, a rail or another system (not shown) beneath the aerial vehicle 910 in order to establish a baseline distance b between the lenses or sensors of the imaging device 940-1, 940-2. The aerial vehicle 910 is shown as approaching a ground-based point P(x,y,z) in space that is within a field of view of the imaging devices 940-1, 940-2. As is shown in FIG. 9A, an image 90-1 captured by the imaging device 940-1 at time $t_1$ includes a projection $U_1$ of the point P(x,y,z). An image 90-2 captured by the imaging device 940-1 at approximately time $t_1$ includes a projection $U_2$ of the point P(x,y,z).

As is discussed above, the baseline separation b between the imaging devices 940-1, 940-2 at time $t_1$ may be determined based on positions of the imaging devices 940-1, 940-2. As is shown in FIG. 9B, a disparity between the projections $U_1$, $U_2$ of the point P(x,y,z) in space within the images 90-1, 90-2 may be determined by overlapping the images 90-1, 90-2 upon one another, or in any other manner, e.g., by one or more matching algorithms.

As is shown in FIG. 9C, an altitude z above the point P(x,y,z) may be determined by stereo ranging using the known baseline separation b, the focal length f of the imaging devices 940-1, 940-2, and the disparity between the projections $U_1$, $U_2$ of the point P(x,y,z) within the image 90-1 and the image 90-2. In some embodiments, one or more stereo ranging algorithms and techniques may automatically determine the position of the point P(x,y,z) in space and, therefore, the altitude z above the point P(x,y,z), by triangulating the positions of the imaging devices 940-1, 940-2 at time $t_1$ with respect to the projections $U_1$, $U_2$ using the focal length f and the baseline separation b. In some embodiments, the imaging devices 940-1, 940-2 may have the same focal length, viz., f, when the images 90-1, 90-2 are captured. In other embodiments, the imaging devices 940-1, 940-2 may have different focal lengths when the images 90-1, 90-2 are captured.

In accordance with the present disclosure, one or both of the imaging devices 940-1, 940-2 may be repositioned with respect to one another in order to enhance the accuracy of determinations of the altitude z during an ascent, a descent or a hovering operation. For example, when the aerial vehicle 910 descends toward the point P(x,y,z), the baseline separation b between the imaging devices 940-1, 940-2 may be narrowed by repositioning one or both of the imaging devices 940-1, 940-2 toward one another. When the aerial vehicle 910 ascends above the point P(x,y,z), the baseline separation b between the imaging devices 940-1, 940-2 may be broadened by repositioning one or both of the imaging devices 940-1, 940-2 away from one another. The baseline separations b may be selected on any basis. For example, in some embodiments, the baseline separations b may be varied continuously or proportionally, as the aerial vehicle 910 ascends or descends, such as with respect to a previously calculated altitude z. In some embodiments, however, the baseline separations b may be defined as a step function, such that the baseline separations b may remain constant when the calculated altitude z is within a predetermined band, window or range of values, and the imaging devices 940-1, 940-2 may be repositioned to establish a new baseline separation b when the calculated altitude z is determined to fall outside of the band, the window or the range.

Although FIGS. 9A, 9B and 9C depict the determination of an altitude above a single point P(x,y,z) in space, the systems and methods of the present disclosure are not so limited, and may be used to determine positions of and/or ranges to each of the points that appears in both of the images 90-1, 90-2, according to the same stereo ranging algorithms or techniques, or to one or more other algorithms or techniques. Using such positions or ranges, any form of three-dimensional representation of the scene and/or the structures, objects or other features may be constructed, including but not limited to a point cloud representing pixel-level positions of each of the points appearing in both of the images 90-1, 90-2, or a depth map that shows average or nominal ranges to one or more of the objects within the scene, along with one or more tolerances or confidence levels representative of the accuracy or precision of such ranges.

Figure 10:
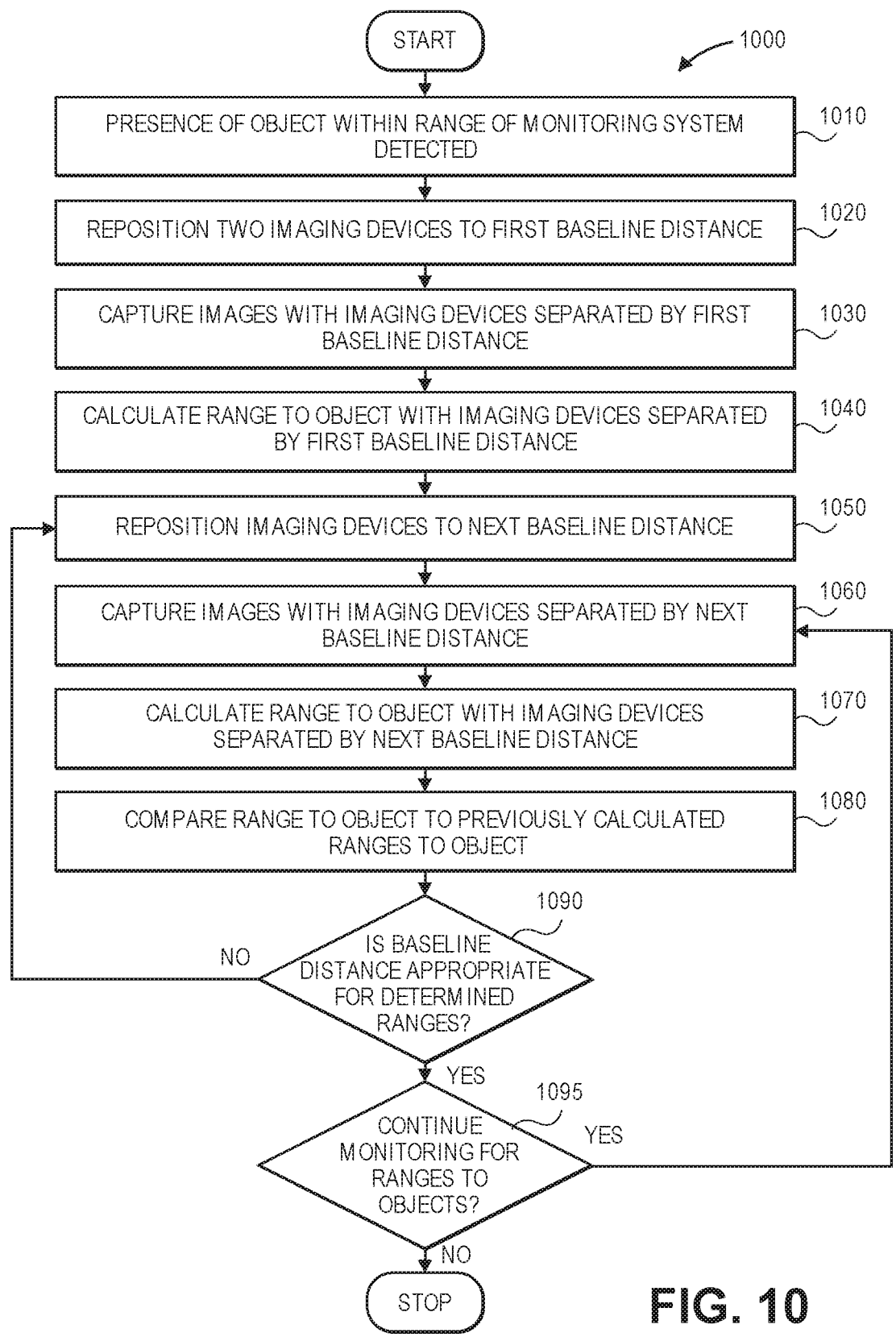
FIG. 10 is a flow chart of one process for determining ranges by imaging devices with dynamic baseline reconfiguration in accordance with embodiments of the present disclosure.

As is discussed above, imaging data may be captured by imaging devices that are separated by a variety of baseline distances, e.g., by repositioning one or both of the imaging devices with respect to one another. Images captured by the imaging devices may be processed by stereo ranging algorithms or techniques to determine ranges to any objects that are expressed in each of the images, regardless of how near or how far such objects are positioned from the imaging devices. Referring to FIG. 10, a flow chart 1000 of one process for determining ranges by imaging devices with dynamic baseline reconfiguration in accordance with embodiments of the present disclosure is shown.

At box 1010, the presence of an object within range of a monitoring system is detected. For example, the measuring system may include one or more imaging devices, acoustic sensors, radar sensors, laser sensors, or other systems, any of which may detect the object within their respective operating ranges, e.g., within one or more images, sound signals, radar echoes, light reflections, or any other signals captured by the monitoring system. The monitoring system may be provided aboard any type or form of vehicle, e.g., an aerial vehicle, a ground-based vehicle such as an automobile, a train or a bicycle, or a seagoing vessel, or mounted to one or more ground-based structures.

At box 1020, a pair of imaging devices of the monitoring system may be repositioned to a first baseline distance. For example, one or both of the imaging devices may be associated with motorized or movable systems for translating, sliding or otherwise moving the imaging devices with respect to one another, e.g., by way of a track, a rail or another system. Alternatively, one of the imaging devices may be fixed in position, and another of the imaging devices may be repositioned by relative motion to establish the first baseline distance between the imaging devices.

At box 1030, images are captured by the imaging devices separated by the first baseline distance. For example, the imaging devices may be synchronized and operated simultaneously, or nearly simultaneously, to capture one or more images. Alternatively, each of the imaging devices may capture a plurality of images, e.g., by streaming, and the images may be synchronized based on time stamps or other identifiers.

At box 1040, a range to an object depicted within the images captured by the imaging devices is calculated with the imaging devices separated by the first baseline distance. The range may be calculated according to any stereo ranging algorithms or techniques. For example, as is shown in FIGS. 1E and 1I, a range or distance may be calculated based on a baseline distance between the imaging devices, a focal length of the imaging devices, and a disparity between points appearing in images captured by the imaging devices.

At box 1050, the imaging devices are repositioned to a next baseline distance, e.g., by causing one or both of the imaging devices to translate, slide or otherwise move to a different position with respect to a track, a rail or another system. At box 1060, images are captured with the imaging devices separated by the second baseline distance, e.g., simultaneously or nearly simultaneously, or in streams of images captured in series. At box 1070, a range to the object is calculated with the imaging devices separated by the second baseline distance, e.g., according to one or more stereo ranging algorithms or techniques.

At box 1080, the range calculated at box 1070 is compared to one or more ranges to the object that were previously calculated, such as the range to the object that was capture at box 1040. At box 1090, whether the baseline distance is appropriate for the calculated ranges is determined. For example, if the ranges calculated to the object at box 1040 and at box 1070 are descending, signifying that an airborne or ground-based object is approaching the aerial vehicle, the baseline distance may be too large to accurately detect ranges to the object. If the ranges calculated to the object are increasing, signifying that an airborne or ground-based object is departing from the aerial vehicle, the baseline distance may be too small to accurately detect ranges to the object in the future. Alternatively, one or more bands or windows of baseline distances may be assigned to specific ranges, such that the baseline distance may be modified if the ranges fall outside of a given band or window, or maintained if the baseline distance is within the given band or window. If the baseline distance is not appropriate for the calculated ranges, then the process returns to box 1050, where the imaging devices are repositioned to another baseline distance.

If the ranges are appropriate for the calculated ranges, however, then the process advances to box 1095, where whether the continued monitoring of ranges to the object is desired is determined. If the continued monitoring of ranges to the object is desired, then the process returns to box 1060, where images are captured with the imaging devices at the previously established baseline distance. If the continued monitoring of ranges to the object is not desired, however, then the process ends.

Figure 11:
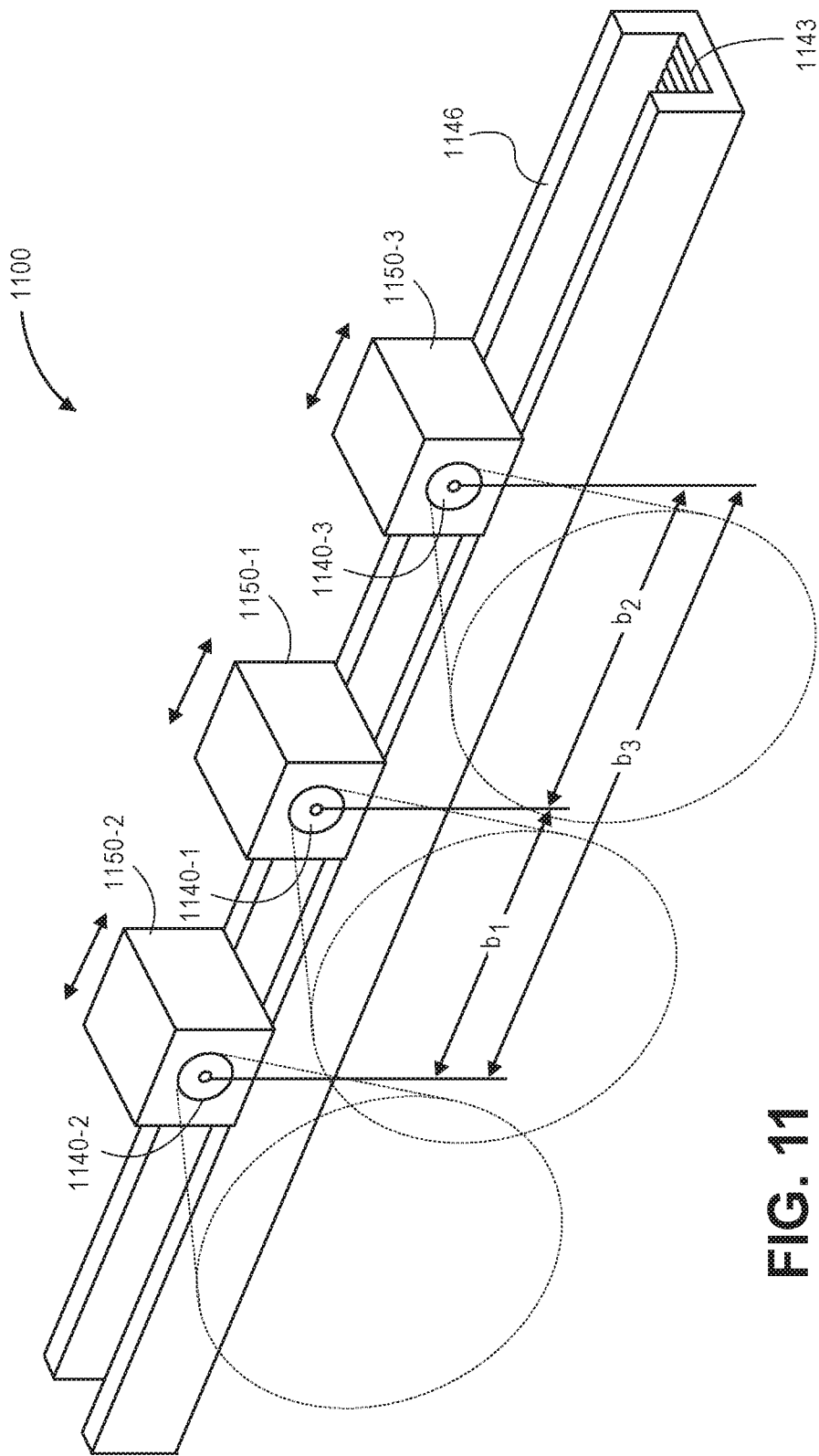
FIG. 11 is a view of aspects of one system for determining ranges by imaging devices with dynamic baseline reconfiguration in accordance with embodiments of the present disclosure.

A track, a rail or another system for accommodating the motion of imaging devices are not limited to a pair of (viz., two) imaging devices, and may include three or more of such imaging devices. Referring to FIG. 11, a view of aspects of one system for determining ranges by imaging devices with dynamic baseline reconfiguration in accordance with embodiments of the present disclosure is shown. Except where otherwise noted, reference numerals preceded by the number "11" shown in FIG. 11 indicate components or features that are similar to components or features having reference numerals preceded by the number "9" shown in FIGS. 9A through 9C, by the number "8" shown in FIG. 8, by the number "7" shown in FIG. 7, by the number "6" shown in FIG. 6, by the number "5" shown in FIGS. 5A through 5C, by the number "4" shown in FIG. 4, by the number "2" shown in FIG. 2 or by the number "1" shown in FIGS. 1A through 1I.

As is shown in FIG. 11, a system 1100 includes three imaging devices 1140-1, 1140-2, 1140-3 and a track 1146. The imaging devices 1140-1, 1140-2, 1140-3 are each disposed within housings 1150-1, 1150-2, 1150-3 that are configured to dynamically translate along the track 1146, e.g., by one or more motors or other systems. The imaging devices 1140-1, 1140-2, 1140-3 are each aligned to capture imaging data in directions that are lateral, or transverse, to an axis of the track 1146, and overlap on a left side of the track 1146. The track 1146 shown in FIG. 11 is a single segment or unit for accommodating the motion of the housings 1150-1, 1150-2, 1150-3. Alternatively, the track 1146 may include two or even three segments or units, with each of the housings 1150-1, 1150-2, 1150-3 being configured to translate within one or more of the respective segments or units. Additionally, the track 1146 includes a gear rack 1143 for mating with one or more gears (not shown), e.g., spur gears, of the housings 1150-1, 1150-2, 1150-3.

The housings 1150-1, 1150-2, 1150-3 may be repositioned with respect to one another, independently or in concert, in order to establish various baseline distances $b_1$, $b_2$, $b_3$ between the lenses or sensors of the imaging devices 1140-1, 1140-2, 1140-3. For example, the baseline distance $b_1$ may be established by repositioning one or both of the housings 1150-1, 1150-2 along the track 1146, and determining the positions of the lenses or sensors of the imaging devices 1140-1, 1140-2, e.g., by one or more encoders or other position-determining systems. The baseline distance $b_2$ may be established by repositioning one or both of the housings 1150-1, 1150-3 along the track 1146, and determining the positions of the lenses or sensors of the imaging devices 1140-1, 1140-3. The baseline distance $b_3$ may be established by repositioning one or both of the housings 1150-2, 1150-3 along the track 1146, and determining the positions of the lenses or sensors of the imaging devices 1140-2, 1140-3.

Although some of the embodiments disclosed herein reference the use of unmanned aerial vehicles, those of ordinary skill in the pertinent arts will recognize that the systems and methods disclosed herein are not so limited, and may be utilized in connection with any type or form of aerial vehicle (e.g., manned or unmanned) having fixed or rotating wings for any intended industrial, commercial, recreational or other use.

Any number of imaging devices may be provided on a track, a rail or another system in accordance with the present disclosure. Moreover, although some of the rails, the tracks or like systems disclosed herein are shown as being straight, a track, a rail or another like system may be straight or curvilinear in accordance with the present disclosure, and one or more imaging devices may be configured to travel in either direction along the track, the rail or the other like system accordingly.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3 or 10, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle comprising:
    a frame;
    a track mounted to a portion of the frame;
    a first digital camera movably mounted to the track, wherein the first digital camera is configured to be placed in one or more positions along the track;
    a second digital camera;
    a plurality of propulsion motors mounted to the frame, wherein each of the propulsion motors is configured to rotate a propeller about an axis; and
    at least one computer processor,
    wherein the at least one computer processor is configured to at least:
        cause the first digital camera to move from a first position on the track to a second position on the track;
        cause the first digital camera to capture a first digital image with the first digital camera in the second position at a first time;
        cause the second digital camera to capture a second digital image with the second digital camera in a third position at approximately the first time;
        determine a first baseline distance between the second position of the first digital camera at the first time and a third position of the second digital camera at approximately the first time;
        recognize a first representation of a portion of an object within at least a portion of the first image;
        recognize a second representation of the portion of the object within at least a portion of the second image; and
        determine a first distance to at least the portion of the object based at least in part on the first baseline distance, the first representation and the second representation.

2. The unmanned aerial vehicle of claim 1, wherein the track comprises a gear rack,
    wherein the first digital camera is coupled to a motor and a spur gear mating with the gear rack of the track, and
    wherein the motor is configured to rotate the spur gear to cause the first digital camera to translate in a first direction or a second direction along the track.

3. The unmanned aerial vehicle of claim 1, wherein the portion of the frame is one of:
    a forward portion of the frame;
    an aft portion of the frame;
    a port side of the frame;
    a starboard side of the frame; or
    an underside of the frame.

4. The unmanned aerial vehicle of claim 1, wherein the second digital camera is configured to be placed in one or more positions along the track.

5. The unmanned aerial vehicle of claim 1, wherein the at least one computer processor is further configured to at least:
    determine whether the first distance is within a predetermined band; and
    in response to determining that the first distance is not within the predetermined band,
        selecting a second baseline distance for the first imaging device and the second imaging device;
        cause the first digital camera to move from the second position on the track to a fourth position on the track prior to a second time, wherein the second time follows the first time;

cause the second digital camera to move from the third position on the track to a fifth position on the track prior to the second time, wherein the fourth position and the fifth position are separated by the second baseline distance;

cause the first digital camera to capture a third digital image with the first digital camera in the fourth position at the second time;

cause the second digital camera to capture a fourth digital image with the second digital camera in a fifth position at approximately the second time;

recognize a third representation of the portion of the object within at least a portion of the third image;

recognize a fourth representation of the portion of the object within at least a portion of the fourth image; and determine a second distance to at least the portion of the object based at least in part on the second baseline distance, the third representation and the fourth representation.

6. A method comprising:

causing a first imaging device to travel to a first position along a track joined to an external surface of an unmanned aerial vehicle in flight, wherein the first imaging device is configured to travel in a first direction or a second direction along the track;

capturing a first image captured by the first imaging device at a first time, wherein the first image is captured with the first imaging device in the first position;

capturing a second image captured by a second imaging device at approximately the first time, wherein the second image is captured with the second imaging device in a second position on the external surface of the unmanned aerial vehicle, and wherein a first field of view of the first imaging device overlaps a second field of view of the second imaging device at least in part;

determining a baseline distance at approximately the first time based at least in part on the first position and the second position;

recognizing at least a portion of an object depicted in the first image by at least one computer processor;

recognizing at least the portion of the object depicted in the second image by the at least one computer processor; and calculating, by the at least one computer processor, a range to the portion of the object based at least in part on the baseline distance and a disparity between the portion of the object depicted in the first image and the portion of the object depicted in the second image.

7. The method of claim 6, wherein the second imaging device is movably mounted to the external surface of the unmanned aerial vehicle, wherein the second imaging device is configured to move in a third direction or a fourth direction along a second axis, and wherein the method further comprises:

determining the second position of the second imaging device at approximately the first time.

8. The method of claim 6, wherein the track comprises a gear rack disposed therein, wherein the first imaging device is disposed in a first housing comprising a first motor and a first gear movably coupled to the gear rack of the track, and wherein the first motor is configured to cause the first housing to travel in the first direction or the second direction along the track.

9. The method of claim 6, wherein the second imaging device is fixed in position with respect to the track.

10. The method of claim 6, wherein the second imaging device is configured to travel in the first direction or the second direction along the track.

11. The method of claim 6, wherein the track is one of straight or curvilinear.

12. The method of claim 6, wherein the unmanned aerial vehicle comprises a magnetic encoder having at least one magnetoresistive pickup element coupled to the first imaging device, wherein the track further comprises a linear magnet having a plurality of magnets aligned in series with alternating polarities, and wherein the first position of the first sensor of the first imaging device is determined by the magnetic encoder based at least in part on a magnetic field sensed by the at least one magnetoresistive pickup element.

13. The method of claim 6, wherein the first imaging device further comprises a laser ranging system coupled to the first imaging device, wherein the laser ranging system is configured to emit at least one laser beam toward at least one surface of the second imaging device, wherein the laser ranging system is configured to receive the at least one laser beam reflected from the at least one surface of the second imaging device, and wherein determining the baseline distance between the first position of the first imaging device at the first time and the second position of the second imaging device at the second time comprises:

determining an elapsed time between an emission of the at least one laser beam and a reception of the at least one laser beam.

14. The method of claim 6, wherein the first imaging device further comprises a third imaging device mounted thereto, wherein the second imaging device further comprises at least one surface having a fiducial marking thereon, wherein the at least one surface of the second imaging device is within a field of view of the third imaging device, and wherein determining the baseline distance between the first position of the first imaging device at the first time and the second position of the second imaging device at the second time comprises:

capturing a third image by the third imaging device at approximately the first time; and determining the baseline distance based at least in part on a dimension of the fiducial marking and the third image by the at least one computer processor.

15. The method of claim 6, wherein recognizing at least the portion of the object depicted in the first image comprises:

identifying a first representation of at least one point corresponding to the object in the first image by the at least one computer processor, wherein recognizing at least the portion of the object depicted in the second image comprises:

identifying a second representation of the at least one point corresponding to the object in the second image by the at least one computer processor, and wherein calculating the range to the portion of the object comprises:

defining a first line from the first position through the first representation by the at least one computer processor;

defining a second line from the second position through the second representation by the at least one computer processor; and calculating the range to the portion of the object based at least in part on an intersection of the first line and the second line by the at least one computer processor.

16. The method of claim 6, wherein each of the first field of view and the second field of view extends forward of the unmanned aerial vehicle.

17. The method of claim 6, wherein each of the first field of view and the second field of view extends below the unmanned aerial vehicle.

18. A method comprising:

capturing a first image by a first imaging device at a first time, wherein the first imaging device is movably mounted to a track joined to an external surface of an unmanned aerial vehicle;

capturing a second image by a second imaging device at approximately the first time, wherein the second imaging device is movably mounted to the track joined to the external surface of the unmanned aerial vehicle, and wherein a first field of view of the first imaging device overlaps a second field of view of the second imaging device at least in part;

determining a first position of a first sensor of the first imaging device at the first time;

determining a second position of a second sensor of the second imaging device at approximately the first time;

determining a first baseline distance between the first position of the first imaging device at the first time and the second position of the second sensor of the second imaging device at approximately the first time;

recognizing at least a first portion of an object depicted in the first image by at least one computer processor;

recognizing at least the first portion of the object depicted in the second image by the at least one computer processor; and calculating a first range to the first portion of the object at approximately the first time based at least in part on the first baseline distance and a first disparity between the first portion of the object depicted in the first image and the first portion of the object depicted in the second image by the at least one computer processor.

19. The method of claim 18, further comprising:

determining whether the first range is within a predetermined band; and in response to determining that the second range is not within the predetermined band, selecting a second baseline distance for the first imaging device and the second imaging device;

repositioning the first imaging device to a third position along the track prior to a second time, wherein the second time follows the first time; and repositioning the second imaging device to a fourth position along the track prior to the second time, wherein the fourth position is separated from the third position by the second baseline distance.

20. The method of claim 19, further comprising:

capturing a third image by the first imaging device at the second time;

capturing a fourth image by the second imaging device at approximately the second time;

recognizing at least a second portion of the object depicted in the third image by the at least one computer processor;

recognizing at least the second portion of the object depicted in the fourth image by the at least one computer processor; and calculating a second range to the second portion of the object based at least in part on the second baseline distance and a second disparity between the second portion of the object depicted in the third image and the second portion of the object depicted in the second image by the at least one computer processor.

* * * * *